(12) United States Patent
Tucker et al.

(10) Patent No.: US 11,524,638 B2
(45) Date of Patent: *Dec. 13, 2022

(54) ENHANCED COMMUNICATION SYSTEM FOR VEHICLE HAZARD LIGHTS

(71) Applicant: ESS-Help, Inc., Houston, TX (US)

(72) Inventors: David M. Tucker, Katy, TX (US); Daniel Anthony Tucker, Santee, CA (US); John Zachariah Cobb, Seabrook, TX (US); Jonathan Torkelson, Tulsa, OK (US); Denver Kimberlin, Coweta, OK (US); Devender Nath Maurya, Madanpur Khadar (IN)

(73) Assignee: ESS-HELP, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/153,830

(22) Filed: Jan. 20, 2021

(65) Prior Publication Data

US 2021/0138981 A1 May 13, 2021

Related U.S. Application Data

(63) Continuation of application No. 16/878,160, filed on May 19, 2020, which is a continuation of application
(Continued)

(51) Int. Cl.
*B60R 16/023* (2006.01)
*B60Q 1/46* (2006.01)
(Continued)

(52) U.S. Cl.
CPC ............ *B60R 16/0231* (2013.01); *B60Q 1/38* (2013.01); *B60Q 1/46* (2013.01); *B60Q 1/0076* (2013.01);
(Continued)

(58) Field of Classification Search
CPC ............ A61B 17/068; A61B 17/07207; A61B 2017/00345; A61B 2017/00367;
(Continued)

(56) References Cited

U.S. PATENT DOCUMENTS 3,553,644 A 1/1971 Elmer
4,176,340 A 11/1979 Steinmeier
(Continued)

FOREIGN PATENT DOCUMENTS

CN 203273673 U 11/2013
CN 107650778 A 2/2018
(Continued)

OTHER PUBLICATIONS

Christianson et al., "Workzone Safety Improvements through Enhanced Warning Signal Devices", "https://escholarship.org/content/qt6nm2g4tg/qt6nm2g4tg.pdf", Publisher: Univerisity of California, Berkeley 2008, Published in: US.
(Continued)

*Primary Examiner* — Omer S Khan
(74) *Attorney, Agent, or Firm* — David G. Woodral; GableGotwals

(57) ABSTRACT

A system for implementing strobing of existing vehicle hazard lights including an interface to a vehicle wiring harness configured to receive input to an existing vehicle flasher module, and a strobing circuit that responds to an activation signal from the vehicle wiring harness that is indicative of a hazard flasher deployment event by producing an electrical output through the interface to the vehicle wiring harness that causes a strobing of existing vehicle hazard lamps.

19 Claims, 20 Drawing Sheets

Related U.S. Application Data

No. 16/359,767, filed on Mar. 20, 2019, now Pat. No. 11,021,117, which is a continuation of application No. 14/875,883, filed on Oct. 6, 2015, now abandoned.

(60) Provisional application No. 62/083,619, filed on Nov. 24, 2014.

(51) Int. Cl.
*B60Q 1/38* (2006.01)
*B60Q 1/52* (2006.01)
*B60Q 1/44* (2006.01)
*B60Q 1/00* (2006.01)
*B60Q 1/26* (2006.01)

(52) U.S. Cl.
CPC .......... *B60Q 1/0082* (2013.01); *B60Q 1/2607* (2013.01); *B60Q 1/444* (2013.01); *B60Q 1/445* (2013.01); *B60Q 1/448* (2013.01); *B60Q 1/52* (2013.01); *B60Q 2900/10* (2013.01)

(58) Field of Classification Search
CPC .. A61B 2017/00398; A61B 2017/0046; A61B 2017/00464; A61B 2017/00473; A61B 2017/00477; A61B 2017/00486; A61B 2017/00734; A61B 90/00; B60Q 1/0076; B60Q 1/0082; B60Q 1/2607; B60Q 1/38; B60Q 1/444; B60Q 1/445; B60Q 1/448; B60Q 1/46; B60Q 1/52; B60Q 2900/10; B60R 16/0231; F04C 2270/041
See application file for complete search history.

(56) References Cited

U.S. PATENT DOCUMENTS

| | | |
|---|---|---|
| 4,227,174 A | 10/1980 | Belcher et al. |
| 4,357,594 A | 11/1982 | Ehrlich et al. |
| 4,550,305 A | 10/1985 | Bookbinder |
| 4,981,363 A | 1/1991 | Lipman |
| 5,043,699 A | 8/1991 | Hayden |
| 5,264,826 A | 11/1993 | Henderson et al. |
| 5,374,920 A | 12/1994 | Evens |
| 5,434,758 A | 7/1995 | Zeidler |
| 5,481,243 A | 1/1996 | Lurie et al. |
| 5,510,763 A | 4/1996 | Deckard et al. |
| 5,515,026 A | 5/1996 | Ewert |
| 5,519,389 A | 5/1996 | Degunther et al. |
| 5,646,385 A | 7/1997 | Bogovican et al. |
| 5,736,925 A * | 4/1998 | Knauff ................. B60Q 1/2611 340/463 |
| 5,775,712 A | 7/1998 | Link et al. |
| 5,850,177 A | 12/1998 | Zimmerman |
| 6,023,221 A | 2/2000 | Michelotti |
| 6,025,775 A | 2/2000 | Erlandson |
| 6,028,512 A | 2/2000 | Schropp et al. |
| 6,078,145 A | 6/2000 | Tillinghast et al. |
| 6,081,188 A | 6/2000 | Kutlucinar et al. |
| 6,181,243 B1 | 1/2001 | Yang |
| 6,229,438 B1 | 5/2001 | Kutlucinar et al. |
| 6,323,766 B1 | 11/2001 | Bartlett et al. |
| 6,351,211 B1 | 2/2002 | Bussard |
| 6,397,133 B1 | 5/2002 | Van Der Pol et al. |
| 6,411,204 B1 | 6/2002 | Bloomfield et al. |
| 6,420,799 B1 | 7/2002 | Sakamoto et al. |
| 6,445,289 B1 | 9/2002 | Roberts |
| 6,456,206 B1 | 9/2002 | Rocca et al. |
| 6,515,584 B2 | 2/2003 | DeYoung |
| 6,623,151 B2 | 9/2003 | Pederson |
| 6,674,182 B2 | 1/2004 | Maynard et al. |
| 6,744,359 B1 * | 6/2004 | Wasilewski ............. B60Q 1/44 307/10.8 |
| 6,842,111 B1 | 1/2005 | Smithson |
| 6,858,986 B2 | 2/2005 | Monk |
| 6,879,251 B2 | 4/2005 | Robbins et al. |
| 6,922,137 B1 | 7/2005 | Bycroft |
| 7,046,160 B2 | 5/2006 | Pederson et al. |
| 7,119,672 B2 | 10/2006 | Subbaraman |
| 7,150,554 B2 | 12/2006 | Calderas |
| 7,199,704 B2 | 4/2007 | Herrig et al. |
| 7,455,139 B2 | 11/2008 | Lee |
| 7,834,751 B2 | 11/2010 | Tewari |
| 7,852,203 B2 | 12/2010 | Herrig et al. |
| 7,961,086 B2 | 6/2011 | Bradley |
| 8,049,610 B2 | 11/2011 | Malik |
| 8,319,662 B1 | 11/2012 | Bontemps et al. |
| 8,393,750 B2 | 3/2013 | Clement |
| 8,398,284 B1 | 3/2013 | Dvorzsak |
| 8,405,498 B1 | 3/2013 | Smith et al. |
| 8,415,901 B2 | 4/2013 | Recker et al. |
| 8,669,853 B1 | 3/2014 | Gardner |
| 8,903,617 B2 | 12/2014 | Braunberger et al. |
| 9,481,331 B1 | 11/2016 | Tucker et al. |
| 9,494,940 B1 | 11/2016 | Kentley |
| 9,616,810 B1 | 4/2017 | Tucker et al. |
| 9,643,533 B1 | 5/2017 | Houss |
| 10,055,985 B1 | 8/2018 | Hayward |
| 10,173,674 B2 | 1/2019 | Bidner |
| 10,351,050 B1 | 7/2019 | Elwell |
| 10,598,332 B1 | 3/2020 | Elwell |
| 2002/0000912 A1 | 1/2002 | DeYoung |
| 2002/0036908 A1 | 3/2002 | Pederson |
| 2002/0078879 A1 | 6/2002 | Wood |
| 2002/0105432 A1 | 8/2002 | Pederson et al. |
| 2003/0001728 A1 | 1/2003 | Flick |
| 2003/0132852 A1 | 7/2003 | Povey et al. |
| 2004/0100373 A1 | 5/2004 | Ponziani |
| 2004/0257214 A1 * | 12/2004 | Smithson ................. B60Q 1/46 340/468 |
| 2005/0099286 A1 | 5/2005 | DeYoung |
| 2005/0134448 A1 | 6/2005 | Perlman et al. |
| 2005/0174227 A1 * | 8/2005 | Bolander ................. B60Q 1/22 340/464 |
| 2005/0237219 A1 | 10/2005 | Pederson |
| 2006/0022520 A1 | 2/2006 | Matheny |
| 2006/0043433 A1 | 3/2006 | Matsushita |
| 2006/0125616 A1 * | 6/2006 | Song ....................... B60Q 1/38 340/463 |
| 2006/0209547 A1 | 9/2006 | Biondo et al. |
| 2007/0142977 A1 | 6/2007 | Munoz |
| 2007/0159319 A1 | 7/2007 | Maldonado |
| 2007/0194905 A1 | 8/2007 | Herrig et al. |
| 2008/0100432 A1 * | 5/2008 | Hoffman ................. B60Q 1/46 340/475 |
| 2009/0045754 A1 | 2/2009 | Jozwik |
| 2009/0219150 A1 | 9/2009 | Deyoung |
| 2009/0322508 A1 | 12/2009 | Malik |
| 2010/0109859 A1 | 5/2010 | Lakosky |
| 2010/0134271 A1 | 6/2010 | Edwards et al. |
| 2010/0225465 A1 | 9/2010 | Ekchian et al. |
| 2010/0253499 A1 | 10/2010 | Haab et al. |
| 2011/0205521 A1 | 8/2011 | Mimeault et al. |
| 2012/0043888 A1 | 2/2012 | Salter et al. |
| 2012/0185130 A1 | 7/2012 | Ekchian et al. |
| 2012/0268262 A1 | 10/2012 | Popovic |
| 2012/0313792 A1 | 12/2012 | Behm et al. |
| 2013/0054087 A1 | 2/2013 | Mohamed |
| 2013/0057160 A1 | 3/2013 | Adams et al. |
| 2013/0093582 A1 | 4/2013 | Walsh et al. |
| 2013/0141251 A1 | 6/2013 | Sims et al. |
| 2013/0190985 A1 | 7/2013 | Nakano et al. |
| 2013/0229289 A1 | 9/2013 | Bensoussan et al. |
| 2014/0055619 A1 | 2/2014 | Holland et al. |
| 2014/0146552 A1 | 5/2014 | Hui |
| 2014/0149025 A1 | 5/2014 | Fazi |
| 2014/0266658 A1 | 9/2014 | Feldman |
| 2014/0300462 A1 | 10/2014 | Russ |
| 2014/0300826 A1 | 10/2014 | Ricci |
| 2014/0361686 A1 | 12/2014 | Wolfe |
| 2014/0368324 A1 | 12/2014 | Seifert |
| 2014/0375810 A1 | 12/2014 | Rodriguez |
| 2015/0061492 A1 | 3/2015 | Braunberger |

(56) References Cited

U.S. PATENT DOCUMENTS

| | | |
|---|---|---|
| 2015/0061895 A1 | 3/2015 | Ricci |
| 2015/0088397 A1 | 3/2015 | Burton |
| 2015/0116133 A1 | 4/2015 | Mawbey et al. |
| 2015/0127212 A1 | 5/2015 | Chacon et al. |
| 2015/0151671 A1 | 6/2015 | Refior et al. |
| 2015/0314723 A1 | 11/2015 | Ghiata et al. |
| 2016/0039336 A1 | 2/2016 | Nordstrom et al. |
| 2016/0098369 A1* | 4/2016 | Berkobin ............ G06F 13/4068 710/106 |
| 2016/0144778 A1 | 5/2016 | Tucker et al. |
| 2016/0152176 A1 | 6/2016 | Kang |
| 2016/0257243 A1 | 9/2016 | Son et al. |
| 2016/0339837 A1 | 11/2016 | Bolduc et al. |
| 2017/0072835 A1 | 3/2017 | Shank et al. |
| 2017/0080850 A1 | 3/2017 | Drexler et al. |
| 2017/0124876 A1 | 5/2017 | Rogers |
| 2017/0243450 A1 | 8/2017 | Keller et al. |
| 2017/0246987 A1 | 8/2017 | Liljestrand |
| 2017/0274816 A1 | 9/2017 | Zhao |
| 2017/0274819 A1 | 9/2017 | Domingo |
| 2017/0305349 A1 | 10/2017 | Naboulsi |
| 2017/0352274 A1 | 12/2017 | Kodama et al. |
| 2017/0364070 A1 | 12/2017 | Oba |
| 2018/0056857 A1 | 3/2018 | Natale et al. |
| 2018/0061225 A1 | 3/2018 | Miglianico |
| 2018/0094777 A1 | 4/2018 | Vargas-Chambers |
| 2019/0210515 A1 | 7/2019 | Aust |
| 2019/0234601 A1 | 8/2019 | Wescott |
| 2019/0279447 A1 | 9/2019 | Ricci |
| 2019/0283693 A1 | 9/2019 | Tucker et al. |
| 2019/0361453 A1 | 11/2019 | Kentley-Klay et al. |
| 2020/0094734 A1 | 3/2020 | King |
| 2020/0189446 A1 | 6/2020 | Tucker et al. |
| 2020/0189453 A1 | 6/2020 | Tucker et al. |
| 2020/0236745 A1 | 7/2020 | Garrett et al. |

FOREIGN PATENT DOCUMENTS

| | | |
|---|---|---|
| CN | 110949241 A | 4/2020 |
| CN | 111216624 A | 6/2020 |
| DE | 10218652 A1 | 11/2003 |
| DE | 102009051837 A1 | 5/2011 |
| DE | 102015205368 A1 | 9/2016 |
| DE | 202017100790 U1 | 3/2017 |
| DE | 102017215865 A1 | 3/2019 |
| DE | 102018128565 A1 | 5/2020 |
| EP | 2827250 A2 | 1/2015 |
| EP | 3178698 A1 | 6/2017 |
| EP | 3287320 A1 | 2/2018 |
| EP | 3702213 A1 | 9/2020 |
| FR | 2833903 | 6/2003 |
| FR | 3056801 A1 | 3/2018 |
| JP | 2002274295 A | 9/2002 |
| JP | 2003-205782 | 7/2003 |
| JP | 2006069245 | 3/2006 |
| JP | 4485901 B2 | 4/2006 |
| JP | 2006182172 A | 7/2006 |
| JP | 2009012554 A | 1/2009 |
| JP | 2011189776 A | 9/2011 |
| JP | 2013-86657 | 5/2013 |
| JP | 2013133071 A | 7/2013 |
| JP | 2014201298 A | 10/2014 |
| JP | 2015009647 A | 1/2015 |
| JP | 2015-44491 | 3/2015 |
| JP | 2018020751 A | 2/2018 |
| JP | 6561286 B1 | 8/2019 |
| JP | 2019206225 A | 12/2019 |
| JP | 2020090183 A | 6/2020 |
| KR | 2019970032975 U | 7/1997 |
| KR | 2019980031131 | 8/1998 |
| KR | 1020030015908 | 2/2003 |
| KR | 100656243 B1 | 12/2006 |
| KR | 1020120048948 | 5/2012 |
| KR | 1020120106036 | 9/2012 |
| KR | 200484734 Y1 | 11/2017 |
| SI | 25623 A | 10/2019 |
| TW | 202022812 A | 6/2020 |
| TW | 202041101 A | 11/2020 |
| WO | 0100446 A1 | 1/2001 |
| WO | 2004018256 A1 | 3/2004 |
| WO | 2008056186 A1 | 5/2008 |
| WO | WO2011154691 A1 | 12/2011 |
| WO | 2018063253 A1 | 4/2018 |
| WO | 2020096060 A1 | 5/2020 |

OTHER PUBLICATIONS

ISA/US, "International Search Report for PCT/US2016/054489", dated Dec. 29, 2016.

PCT/ISA/US, "PCT International Search Report for PCT/US2016/015125", dated Mar. 31, 2016.

"10 Car Options the Law Won't Let You Have: Strobe Brake Lights", Publisher: http://www.popularmechanics.com/cars/news/industry/10-car-options-the-law-wont-let-you-have-4#slide-4.

"Vehicle Brake Light Flasher Module Safety Flash Light Alert", Publisher: http://www.amazon.com/Vehicle-Flasher-Mlodule-Safety-Universal/dp/B00FADDOL4.

"99630 Strobe Power Module", Publisher: http://www.grote.com/products/99630-alternating-x-pattern-led-strobe-lamp-kit-strobe-power-module/.

"Amber Vehicle Car Truck Emergency Hazard Warning", Publisher: www.amazon.com/Vehicle-Emergency-Hazard-Warning-Strobe/dp/B00MA7744G#productDetails.

"Brake Light Strobe Module", Publisher: https://www.superbrightleds.com/moreinfo/strobe-controllers/brake-light-strobe-module/195/.

EPO, "EPO Search Report for EPO App. No. 16917956-1 dated May 13, 2020", "Extended European Search Report prepared for EPO Application No. 16917956.1 dated May 13, 2020", May 13, 2020, Publisher: European Patent Office.

Publisher: European Search Report dated Oct. 2, 2019 prepared for EPO Appl. No. EP19181421.

Jan. 12, 2018, Publisher: Extended European Search Report.

"ELFR-1 QD Electronic LED Flasher Relay With Quick Disconnects", Publisher: www.customled.com/products/elfr-1-qd-electronic-led-flasher-relay.

"ELFR-P Programmable Electronic LED Flasher With OEM Connector", Publisher: www.customled.com/products/elfr-p-led-flasher-relay.

"Flashing Brakes Lights Make a Difference—Look at the Facts", Publisher: http://www.flashingbrakelights.com/.

"Flashing LED Brake Lights", Publisher: http://www.ebay.com/bhp/flashing-led-brake-lights.

"How to Change Hazard Flashers to Strobe Flashers—Chevy Blazer Forums", Publisher: http://blazerforum.com/forum/2nd-gen-s-series-1995-2005-tech-41/how-change-hazard-flashers-strobe-flashers-62080/.

"Intelligent Flashing LED Brake Lights (See How They Work)", Publisher: http://safelightstore.com/.

"ELFR-1 Electronic LED Flasher Relay With OEM Connector", Publisher: www.customled.com/products/elfr-1-electronic-led-flasher-relay.

"Motorcycle Run Brake Turn Conversion Kit", Publisher: http://www.customdynamics.com/tailconversion_kit.htm.

Chris Davies, "Inside Cadillac's early bet on Vehicle-to-Vehicle tech", "Inside Cadillac's early bet on Vehicle-to-Vehicle tech", Mar. 10, 2017, Publisher: https://www.slashgear.com/inside-cadillacs-early-bet-on-v2v-vehicle-to-vehicle-tech-10478130/.

"V2V Safety Technology Now Standard on Cadillace CTS Sedans video", , Publisher: https://media.chevrolet.com/media/ca/en/cadillac/bcportal.html/currentVideoId/5353289496001/pnId/0/typeId/c/currentChannelId/Most%20Recent.html.

Kelley Blue Book, "2017 Cadillac CTS Sedan Adds V2V Capability", Mar. 10, 2017, Publisher: https://www.kbb.com/car-news/2017-cadillac-cts-sedan-adds-v2v-capability/.

\* cited by examiner

ENHANCED COMMUNICATION SYSTEM FOR VEHICLE HAZARD LIGHTS

CROSS-REFERENCE TO RELATED CASES

This application is a continuation of U.S. patent application Ser. No. 16/878,160 entitled ENHANCED COMMUNICATION SYSTEM FOR VEHICLE HAZARD LIGHTS filed on May 19, 2020 which is a continuation of U.S. patent application Ser. No. 16/359,767 entitled ENHANCED COMMUNICATION SYSTEM FOR VEHICLE HAZARD LIGHTS filed on Mar. 20, 2019 which claims the benefit of U.S. patent application Ser. No. 14/875,883 entitled ENHANCED COMMUNICATION SYSTEM FOR VEHICLE HAZARD LIGHTS filed on Oct. 6, 2015 which claims the benefit of U.S. provisional patent application Ser. No. 62/083,619 entitled VISUAL EMERGENCY COMMUNICATION SYSTEM WITH AUTOMATIC DEPLOYMENT CAPABILITY FOR EXISTING VEHICLE WIRING SYSTEMS, filed on Nov. 24, 2014, the contents of which are hereby incorporated by reference.

FIELD OF THE INVENTION

The present disclosure relates to emergency or hazard lights for automobiles, RVs, trailers, motorcycles and vehicles in general, and, more particularly, to emergency or hazard lights that strobe and give visual direction for increased safety and visibility.

BACKGROUND

The advent of light emitting diode (LED) technologies has enhanced lighting capabilities to a point where vehicle based lights are becoming more effective as visual signals during emergencies and hazardous situations. Emergency services, law enforcement agencies, traffic control, and other government agencies have recognized this fact and added separate strobe lighting systems to their vehicles. These systems are added on to what would otherwise be a factory stock lighting setup and operate using a wiring and switch platform that is independent from the traditional hazard light circuit. Foreign and domestic auto manufacturers often use blinker switches based on decades-old technology in order to make automobile blinkers and hazard emergency lights blink or flash. Even where newer microcontrollers are used, they effect only the well-known signal and hazard flasher operations of decades past.

A problem with existing systems and modes of operation with respect to emergency flashers is that a double blinker flashing during an emergency, on a roadside for example, is insufficiently visible and does not provide a high level of clear visual communication to other drivers that a safety hazard exists. Many citizens are killed each year while using their flashing hazard lights during emergency situations on the road. Flashing or double blinking emergency lights are nowhere near as effective as strobing hazard lights.

Another problem with existing emergency flashers is that they are not always deployed when a genuine emergency exists. Occupants may be injured or otherwise unable to deploy the emergency flashers when they are needed most. A disabled vehicle on a roadway is a hazard to other vehicles and all vehicle occupants. In other cases, a vehicle may be off the roadway such that further collision danger is minimal. Nevertheless, hazard lights can be critical in quickly locating vehicles that have left the roadway either purposefully (e.g., to leave the flow of traffic) or as the result of an accident.

Laws related to strobing lights on vehicles address emergency or law enforcement related vehicles. For example, there are laws for emergency and police vehicles reserving a combination of strobing colors on top of vehicles, or in a light bar, or mounted elsewhere. These laws reinforce the belief that strobing lights are significantly more effective during vehicle emergencies due to their higher visibility, attention grabbing attributes, and ability to provide useful visual information and direction to others.

With the increasing use of cell phones and text messaging (while operating a vehicle) becoming more of a safety problem, a need exists to enhance a citizen's emergency visual communication abilities when on the side of the road and without getting out of their vehicle. A need also exists for an automated visual emergency communication system to enhance a citizen's ability to automatically signal to others during emergency situations when the operator is unable to activate such a visual communication signal system on his or her own.

What is needed is a system and method for addressing the above, and related, issues.

SUMMARY OF THE INVENTION

The invention of the present disclosure, in one aspect thereof, comprises a system for implementing strobing of existing vehicle hazard lights including an interface to a vehicle wiring harness configured to receive input to an existing vehicle flasher module, and a strobing circuit that responds to an activation signal from the vehicle wiring harness that is indicative of a hazard flasher deployment event by producing an electrical output through the interface to the vehicle wiring harness that causes a strobing of existing vehicle hazard lamps. The strobing effect on each of the existing vehicle hazard lamps has a cycle that is perceptibly faster than a cycle of existing vehicle signal lights. Wherein a user signals a hazard flasher deployment by an existing vehicle hazard flasher switch inside the vehicle.

The strobing circuit may provide a plurality of different strobing effects via the wiring harness, the plurality of strobing effects being selected by subsequent activation signals indicative of subsequent hazard flasher deployment. At least one of the plurality of strobing effects indicates a directional signal by strobing existing vehicle lamps on one of the left or right side of the vehicle before those of the other side. The interface and the strobing circuit may be an integrated component that replaces an existing vehicle flasher module.

The strobing effect on each of the existing vehicle hazard lamps may have a cycle of at least 8 Hertz. The strobing circuit may comprise a programmable microcontroller and may further comprise an accelerometer. Strobing of existing vehicle hazard lamps may be deployed in response to predetermined acceleration events being detected by the accelerometer. The strobing circuit may also be interfaced to an existing vehicle safety system and cause the strobing of existing vehicle hazard lamps in response to a notification of a predetermined safety related event by the existing vehicle safety system.

The invention of the present disclosure, in another aspect thereof, comprises a vehicle lighting safety device comprising at least one left signal input, at least one right signal input, and at least one hazard input. The device includes a microcontroller communicatively coupled to the at least two signal inputs and the at least one hazard input, and an output communicatively coupled to the microcontroller and capable of driving a plurality of vehicle mounted light emitting diodes divided into left side and right side groups. The microcontroller operates the left side light emitting diode group in a cyclic manner in response to receiving a signal the at least one left signal input. The microcontroller operates the right side light emitting diode group in a cyclic manner in response to receiving s signal on the at least one right input signal. The microcontroller operates both the left side light emitting diode group and the right side light emitting diode group in a strobing manner in response to receiving a signal on the at least one hazard input.

The microcontroller may operate the left and right side diode groups in multiple strobing patterns selected by the at least one hazard input. The device may further comprising an accelerometer communicatively coupled to the microcontroller, wherein the microcontroller operates both the left side light emitting diode group and the right side light emitting diode group in a strobing manner in response to input received from the accelerometer. The microcontroller can be interfaced to an existing vehicle safety system and operate both the left side light emitting diode group and the right side light emitting diode group in a strobing manner in response to a notification of a predetermined safety related event by the existing vehicle safety system.

In some embodiments, the microcontroller is communicatively coupled to the at least two signal inputs and the at least one hazard input via an existing vehicle wiring harness. The microcontroller may operate both the left side light emitting diode group and the right side light emitting diode group in a strobing manner in response to receiving a signal on the at least one hazard input at a frequency of at least 8 Hz.

The invention of the present disclosure, in another aspect thereof, comprises a vehicle safety device having a microcontroller, an analog input block configured to accept inputs from a vehicle wiring harness indicative of deployment of a left signal, a right signal, and hazard flashers and a body control module input block configured to accept inputs from a vehicle body control module indicative of a left signal, a right signal, and hazard flashers. The device also has an output signal block configured to drive at least a front left signal light, a front right signal light, a rear left signal light, and a rear right signal light. The microcontroller accepts input from either of the analog input block or the body control module input block to determine when hazard flashers have been deployed and, when hazard flashers are deployed, drives at least the front left signal light, the front right signal light, the rear left signal light, and the rear right signal light in a repeating flash pattern comprising a portion having a cycle rate that is perceptibly faster than a signal light cycle rate.

In some embodiments, the microcontroller drives at least the front left signal light, the front right signal light, the rear left signal light, and the rear right signal light in a plurality of strobing patterns. The plurality of strobing patterns may be selected by a user using an existing vehicle hazard light switch. The microcontroller may drive at least the front left signal light and left rear signal light in a repeating non-strobing pattern in response to input indicative of a left signal and may drive at least the front right signal light and rear right signal light in the repeating non-strobing pattern in response to input indicative of input indicative of a right signal.

In some embodiments, the analog input block accepts input from an existing vehicle wiring harness. The analog input block may be configured to interface with at least 2, 3, 4, 5, and 8 pin flasher relay systems.

The invention of the present disclosure, in another aspect thereof comprises a vehicle lighting safety device having at least one hazard input communicatively coupled to a driver accessible hazard light switch inside the vehicle, a microcontroller communicatively coupled to the at least one hazard input, and an output communicatively coupled to the microcontroller and capable of driving a plurality of vehicle mounted light emitting diodes, at least some of which are selectively operative as turn signal lights based upon manipulation of a signal light stalk mounted to a vehicle steering column. The microcontroller operates both the plurality of light emitting diodes in a strobing manner in response to receiving a signal on the at least one hazard input. In some embodiments, the microcontroller comprises a body control module. In another embodiment, the microcontroller receives the hazard input via a body control module.

Figure 5:
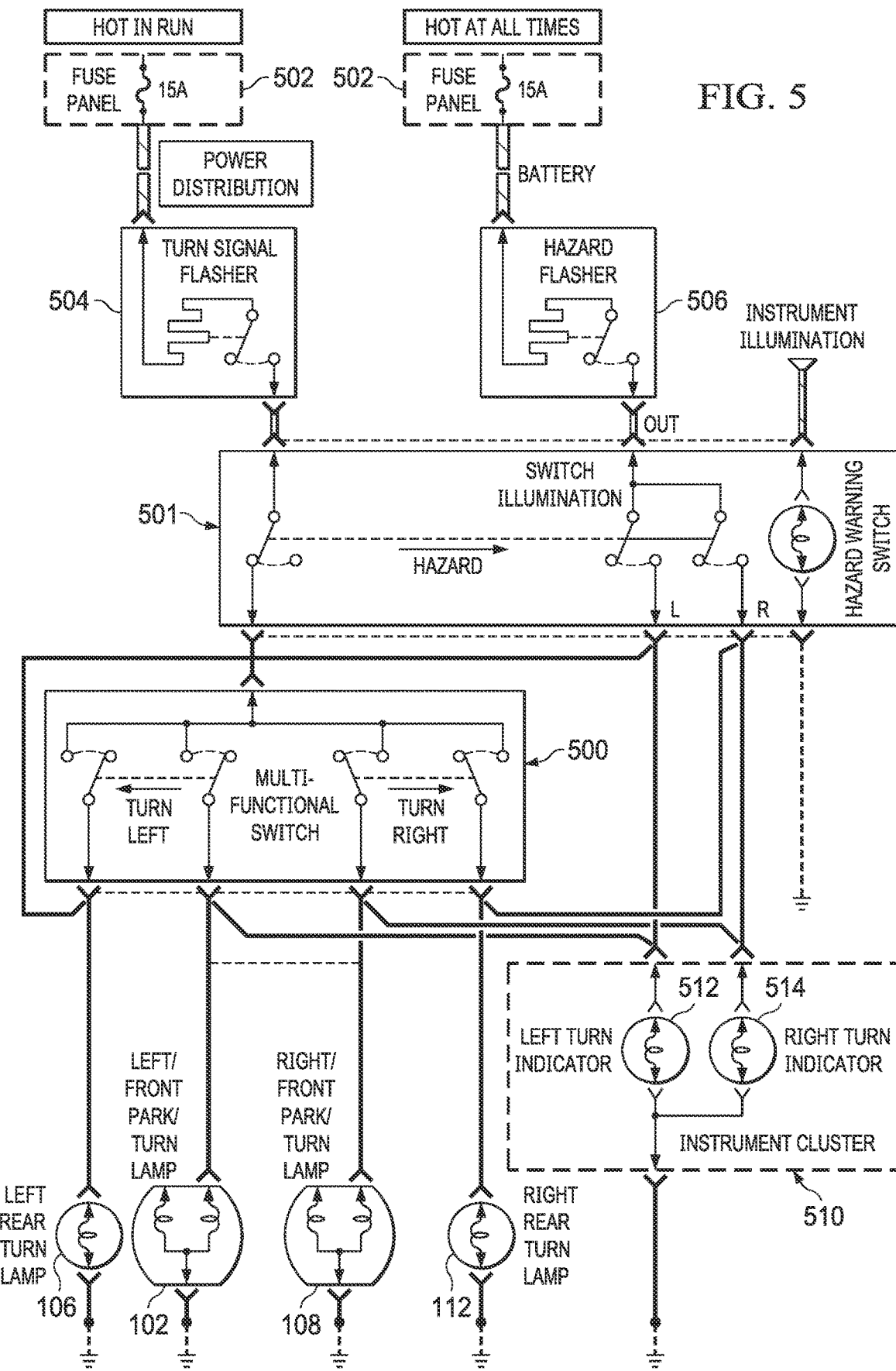
FIG. 5 is a wiring diagram of a two-pin flasher system.

6B is a wiring diagram showing an embodiment of a strobe module according to aspects of the present disclosure installed into the generic two-pin flasher system of FIG. 5 in a different manner.

Figure 7:
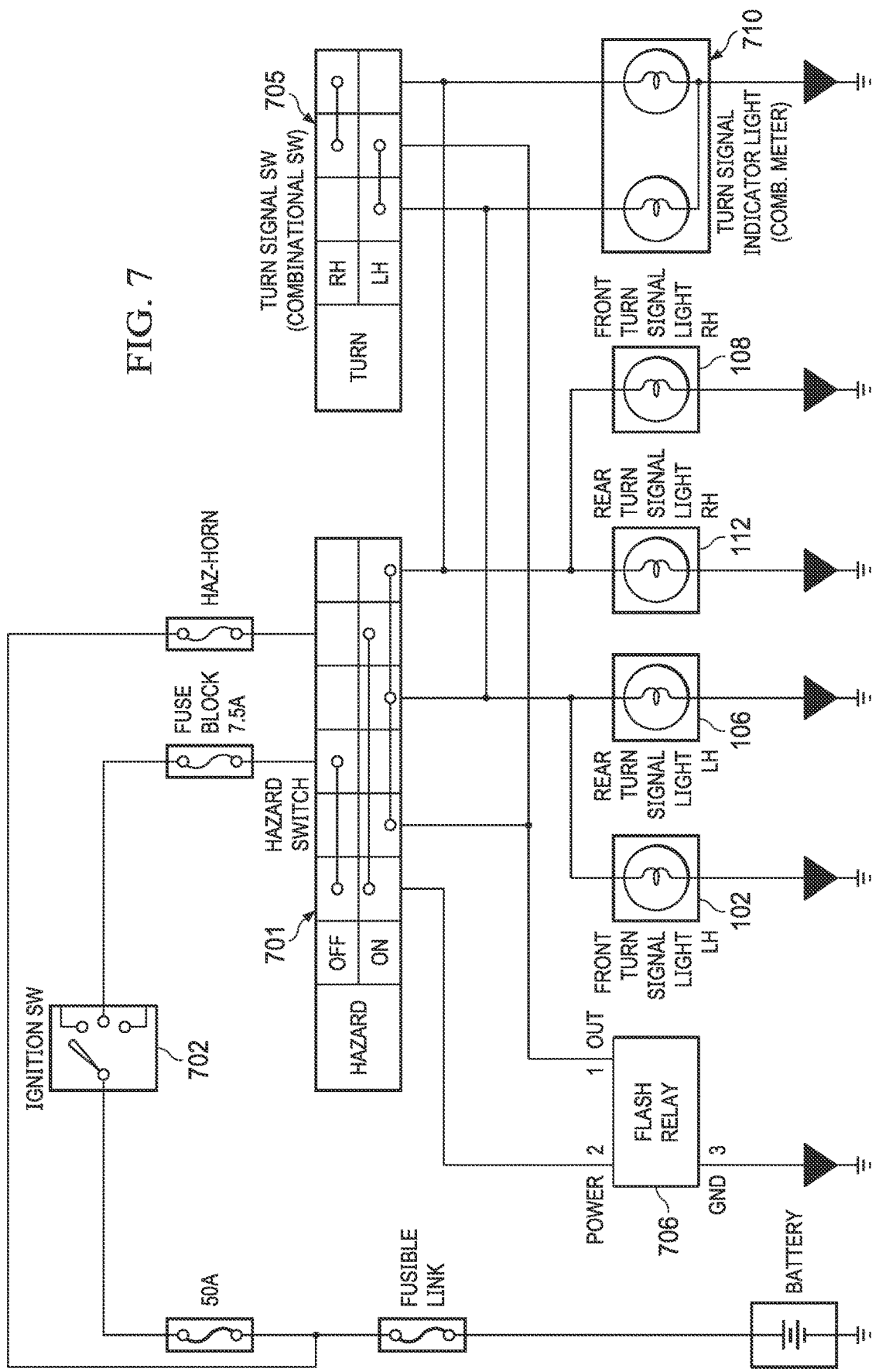

FIG. 7 is a wiring diagram of a three-pin flasher system.

Figure 8:
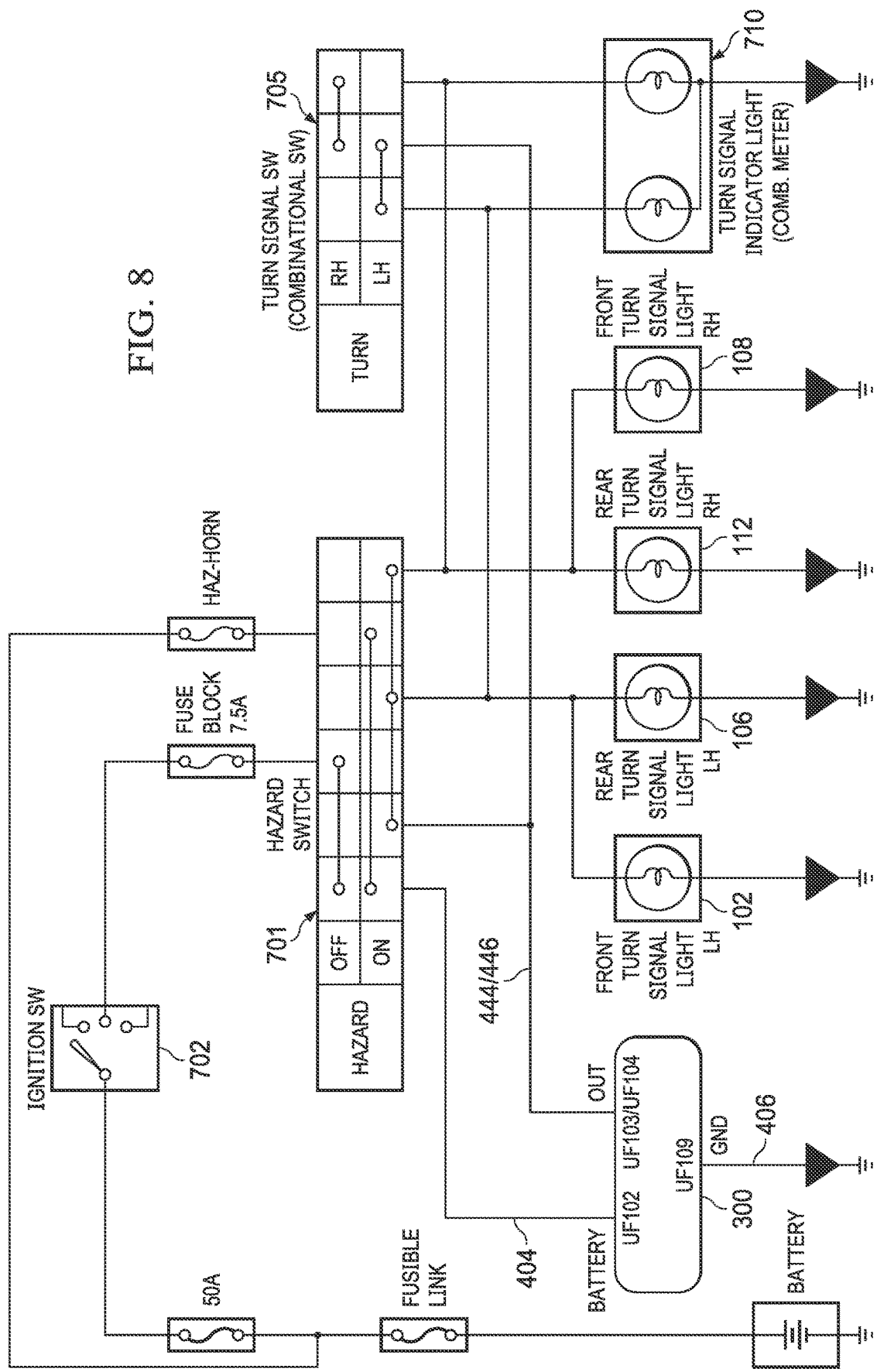

FIG. 8 is a wiring diagram showing an embodiment of a strobe module according to aspects of the present disclosure installed into the three-pin flasher system of FIG. 7.

Figure 9:
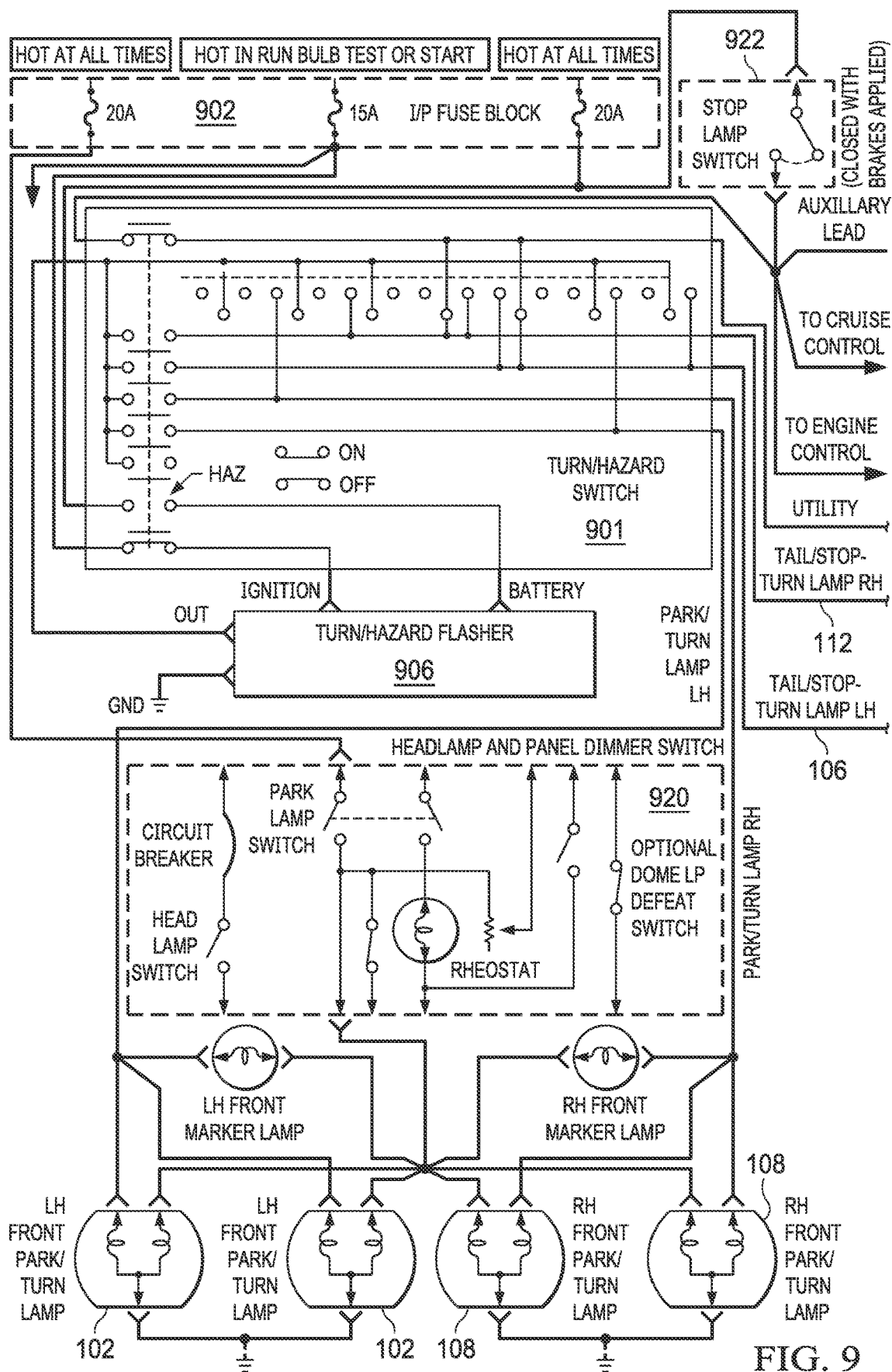

FIG. 9 is a wiring diagram of a four-pin flasher system.

Figure 10:
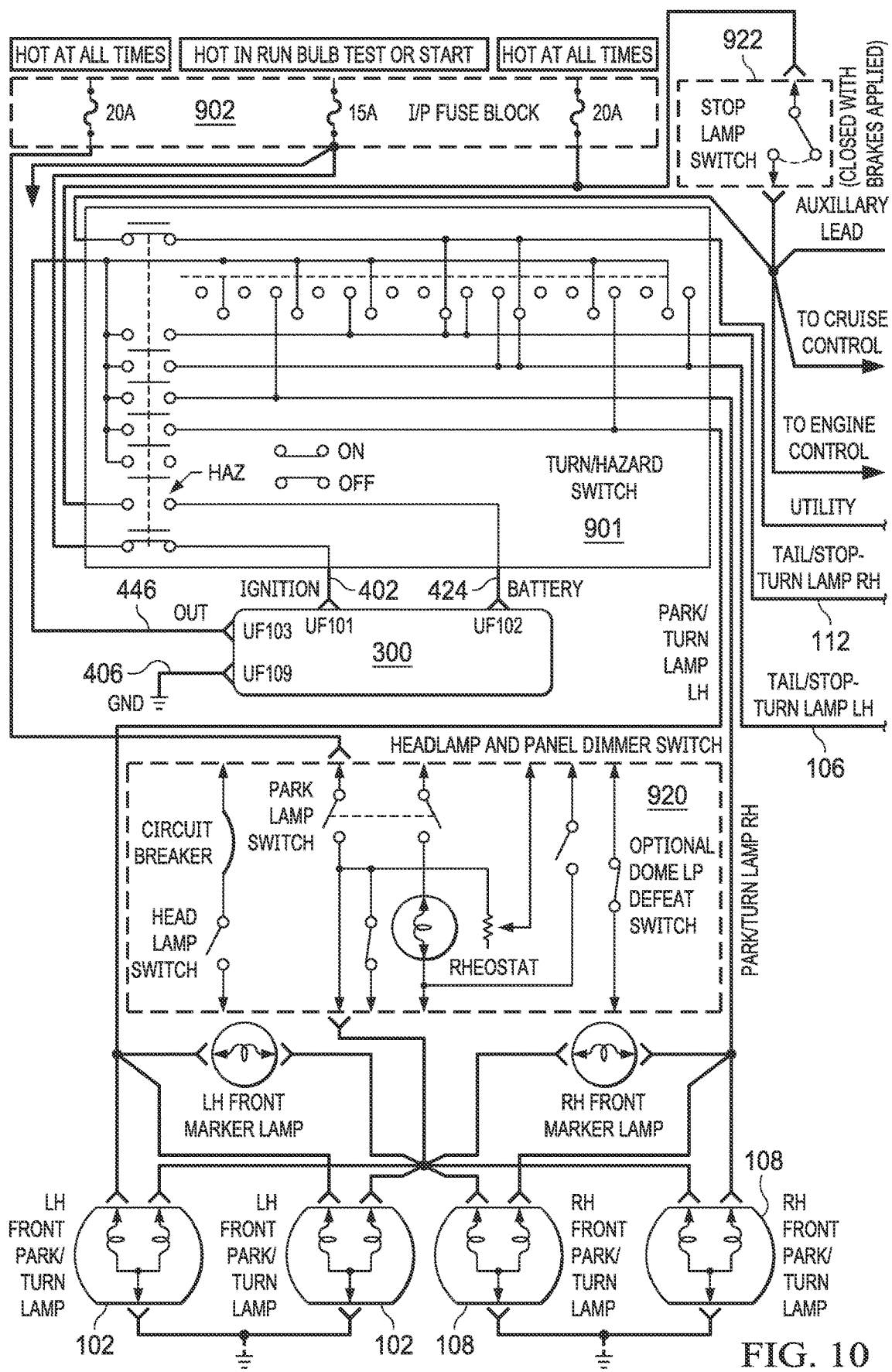

FIG. 10 is a wiring diagram showing an embodiment of a strobe module according to aspects of the present disclosure installed into the four-pin flasher system of FIG. 9.

Figure 11:
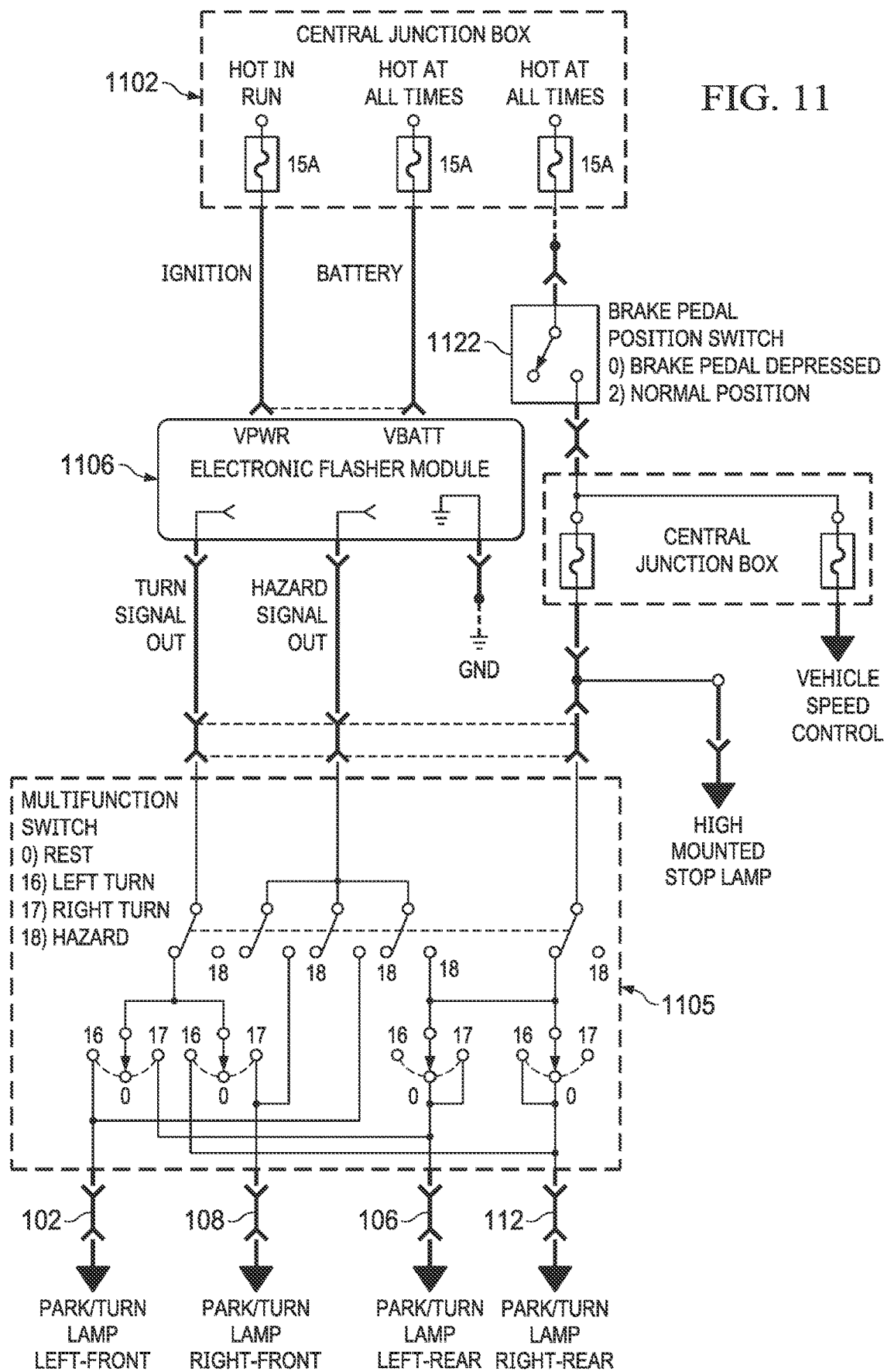

FIG. 11 is a wiring diagram of a five-pin flasher system.

Figure 12:
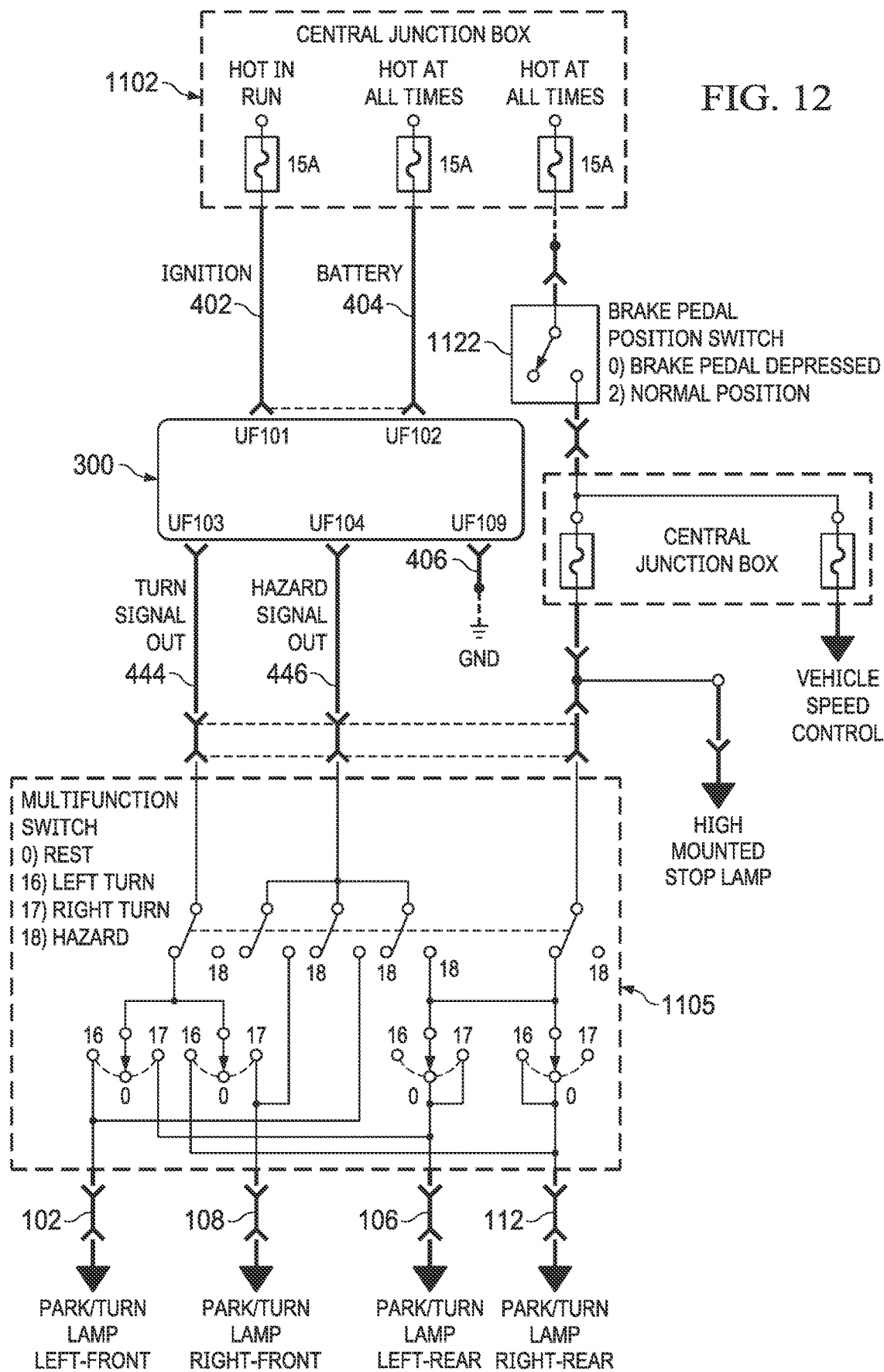

FIG. 12 is a wiring diagram showing an embodiment of a strobe module according to aspects of the present disclosure installed into the five-pin flasher system of FIG. 11.

Figure 13:
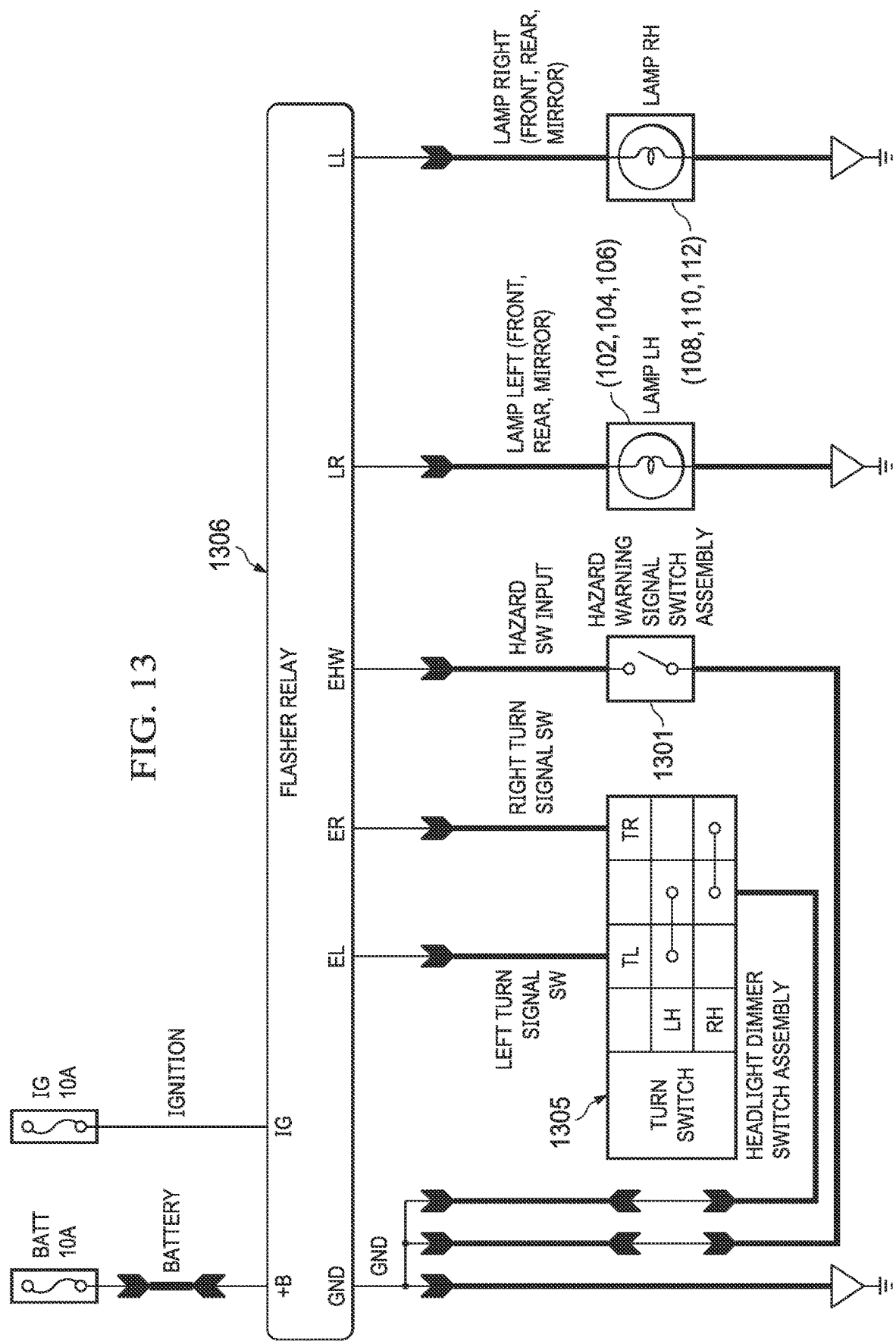

FIG. 13 is a wiring diagram of an eight-pin flasher system.

Figure 14:
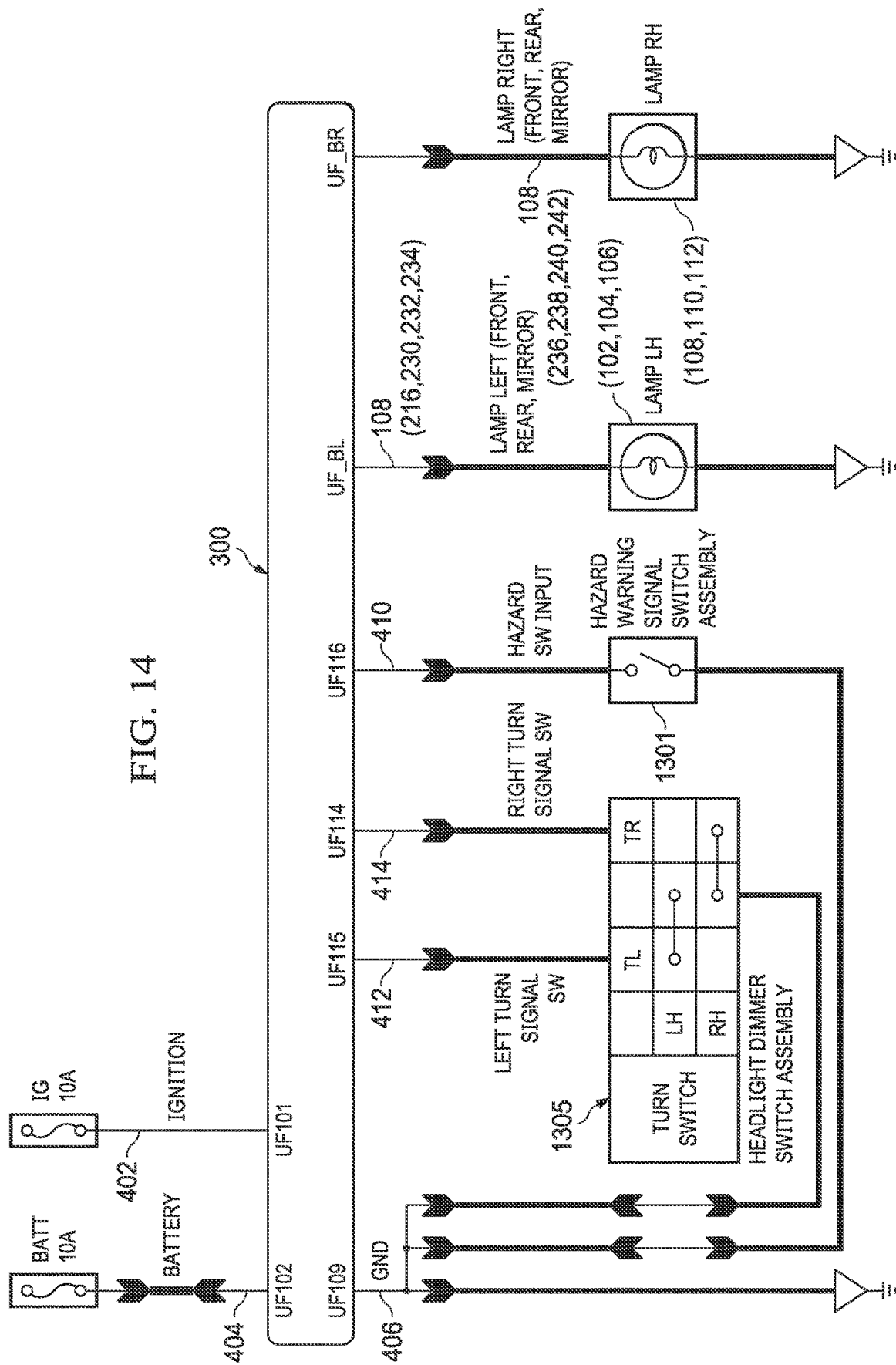

FIG. 14 is a wiring diagram showing an embodiment of a strobe module according to aspects of the present disclosure installed into the eight-pin flasher system of FIG. 13.

Figure 15:
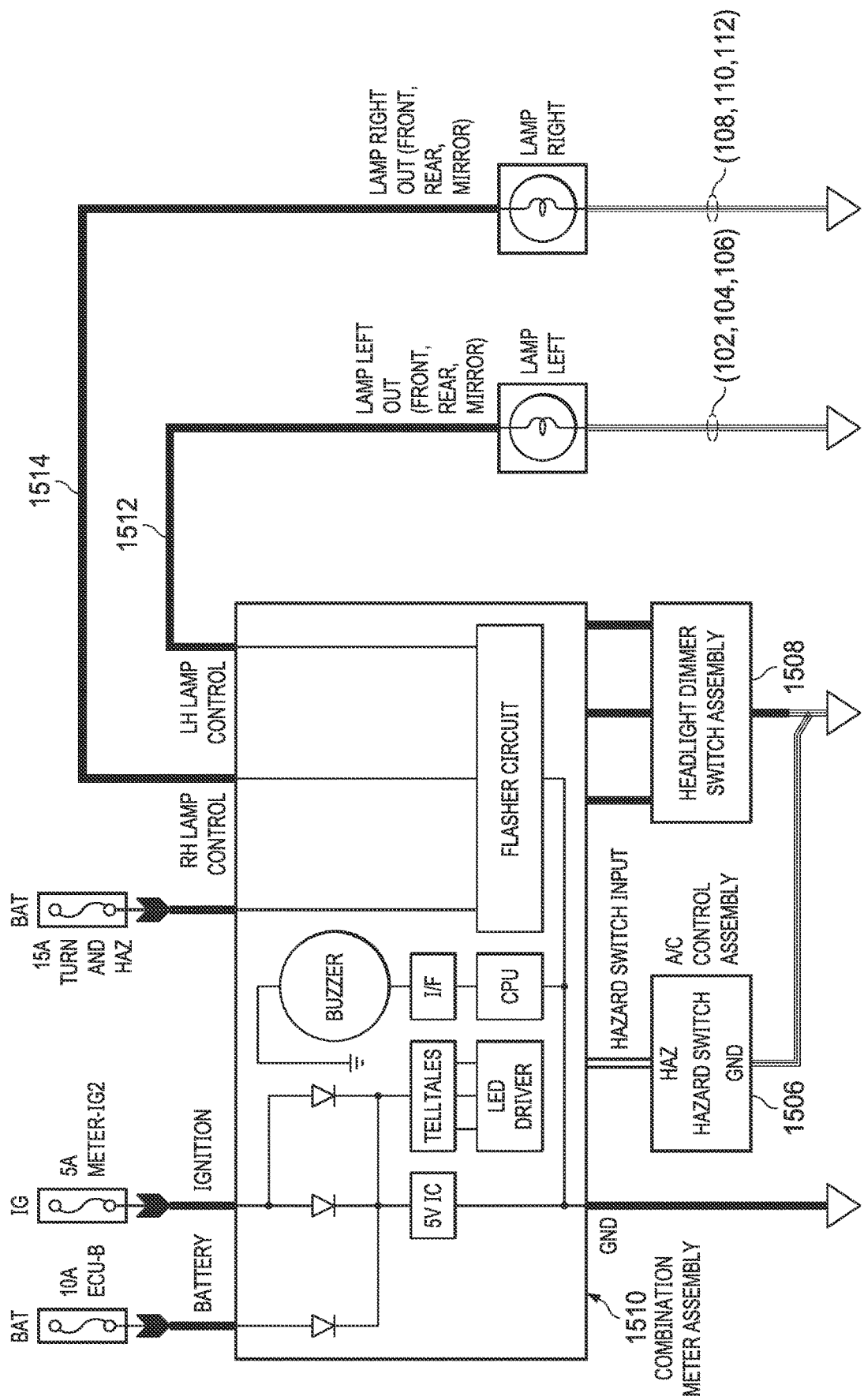

FIG. 15 is a wiring diagram of a flasher system controlled by a body control module (BCM).

Figure 16A:
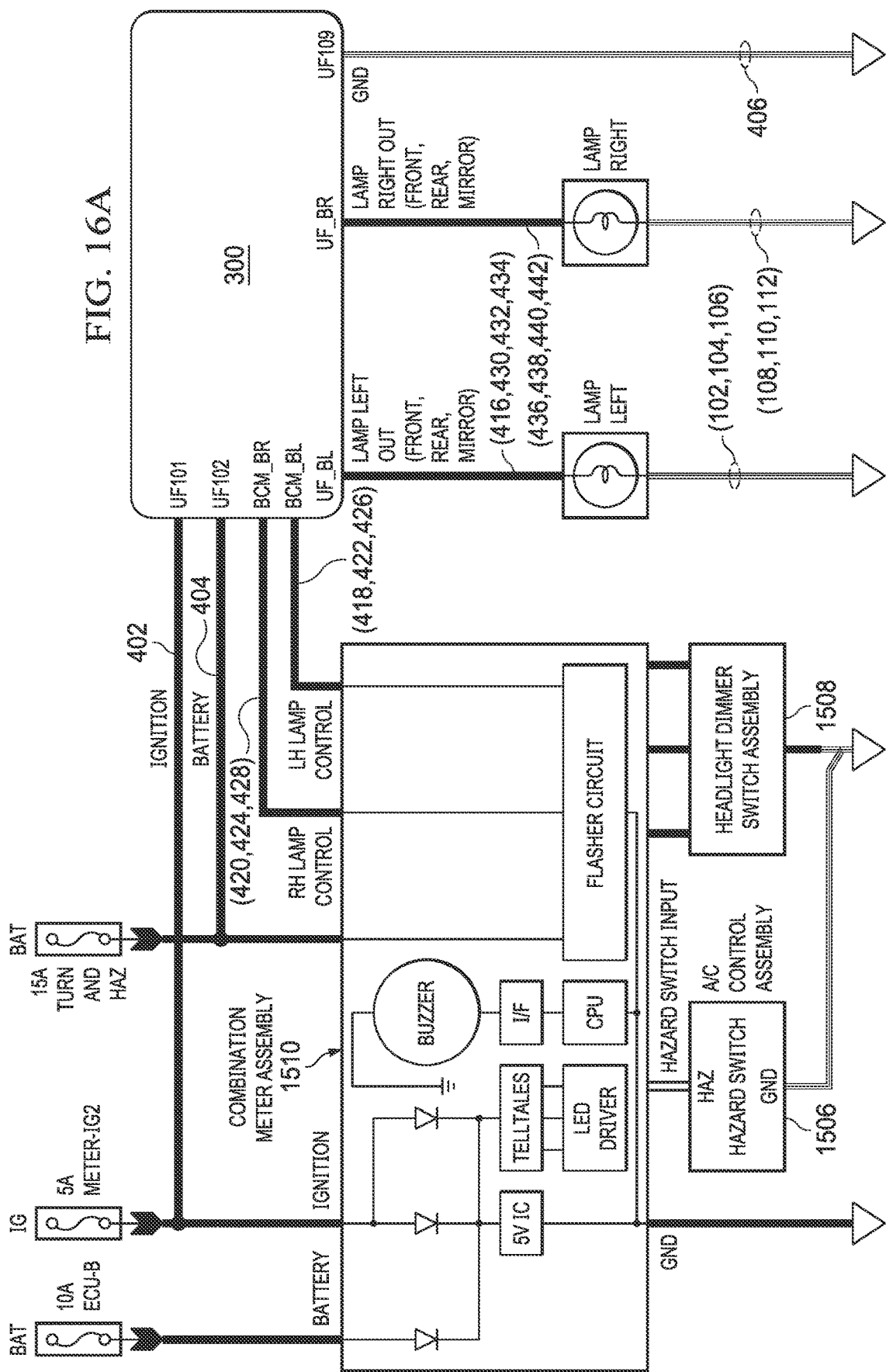

FIG. 16A is a wiring diagram showing an embodiment of a strobe module installed into the BCM controlled flasher system of FIG. 15.

Figure 16B:
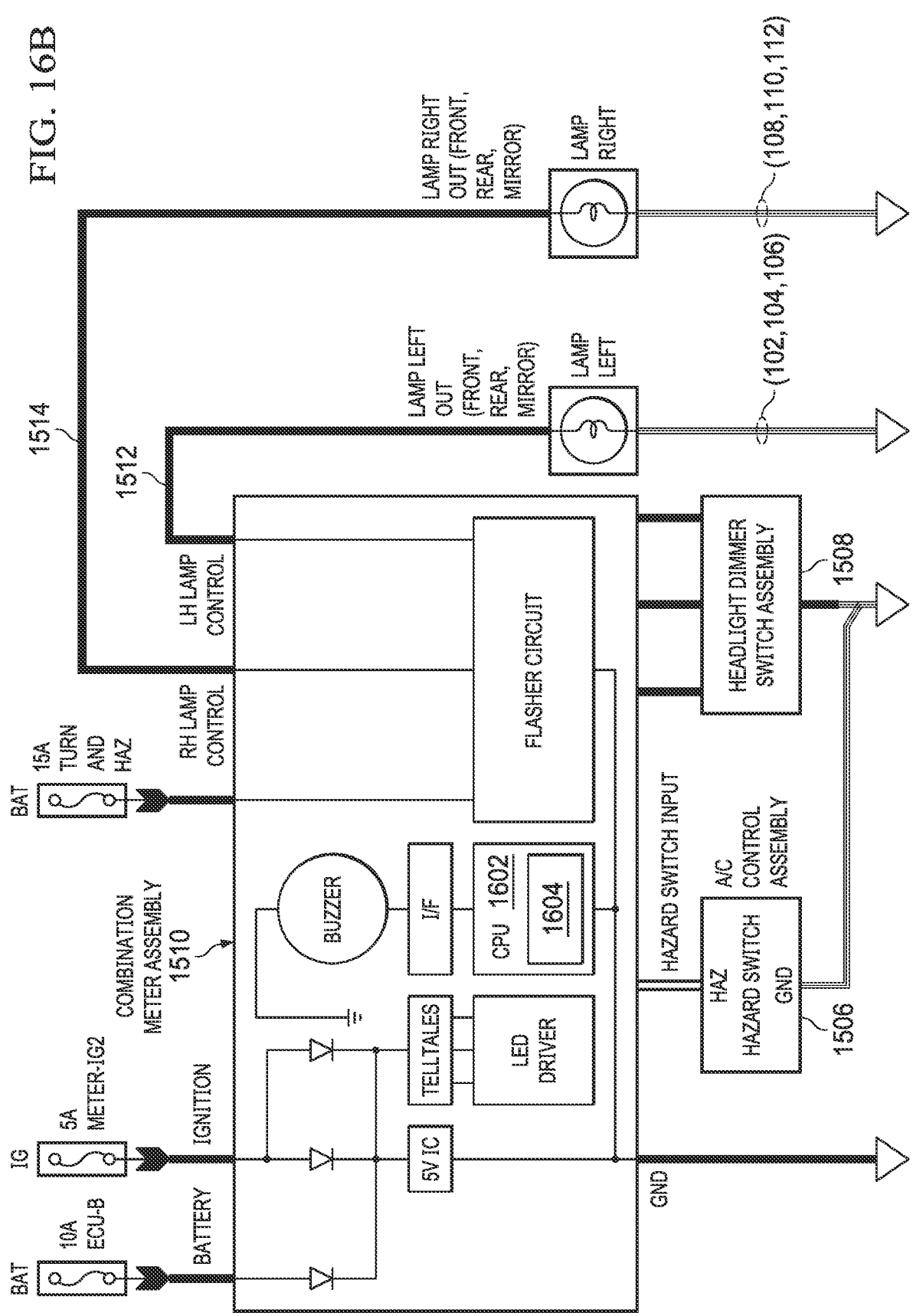

FIG. 16B is a wiring diagram showing an embodiment of a strobe module installed into the BCM controlled flasher system of FIG. 15 via modification of a microcontroller.

Figure 17:
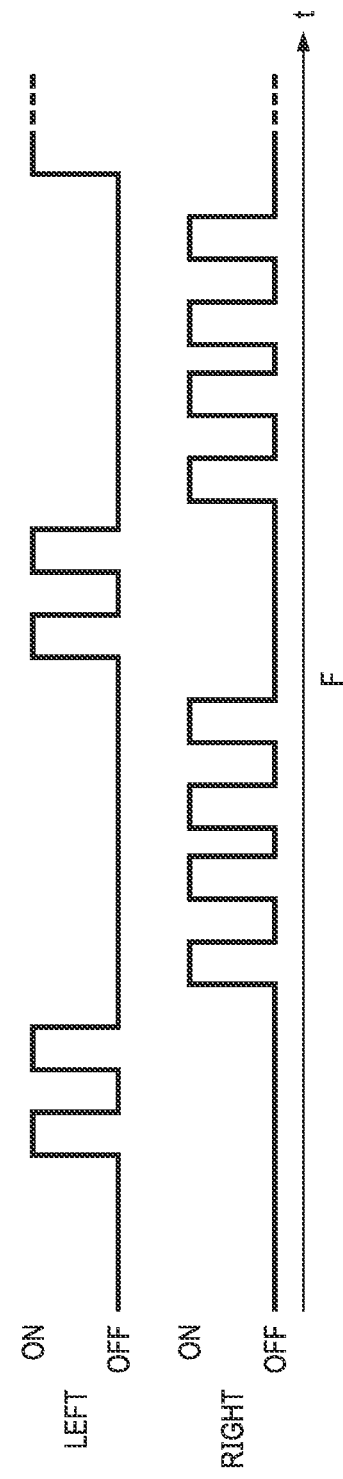

FIG. 17 is a timing diagram showing on and off states for left and right signal lamps over time in a left to right signaling pattern.

Figure 18:
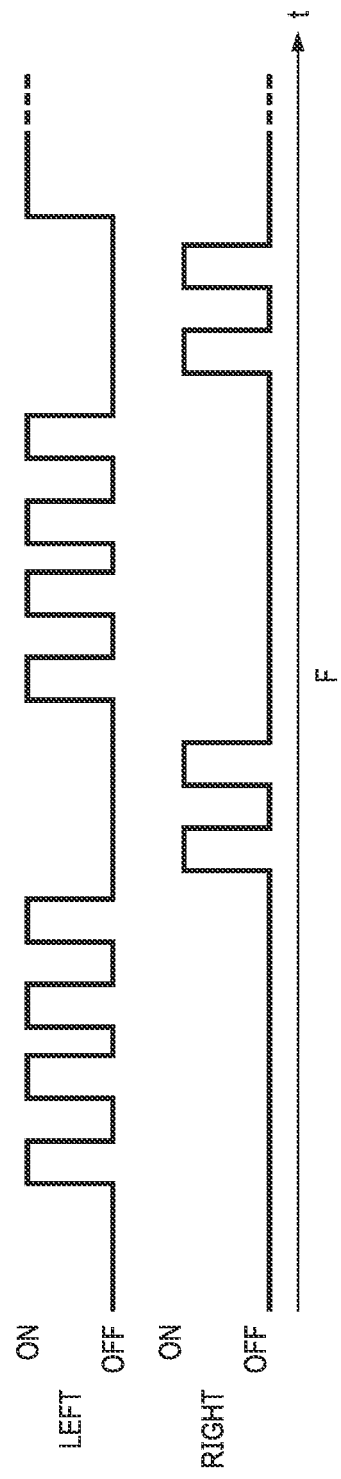

FIG. 18 is a timing diagram showing on and off states for left and right signal lamps over time in a right to left signaling pattern.

Figure 19:
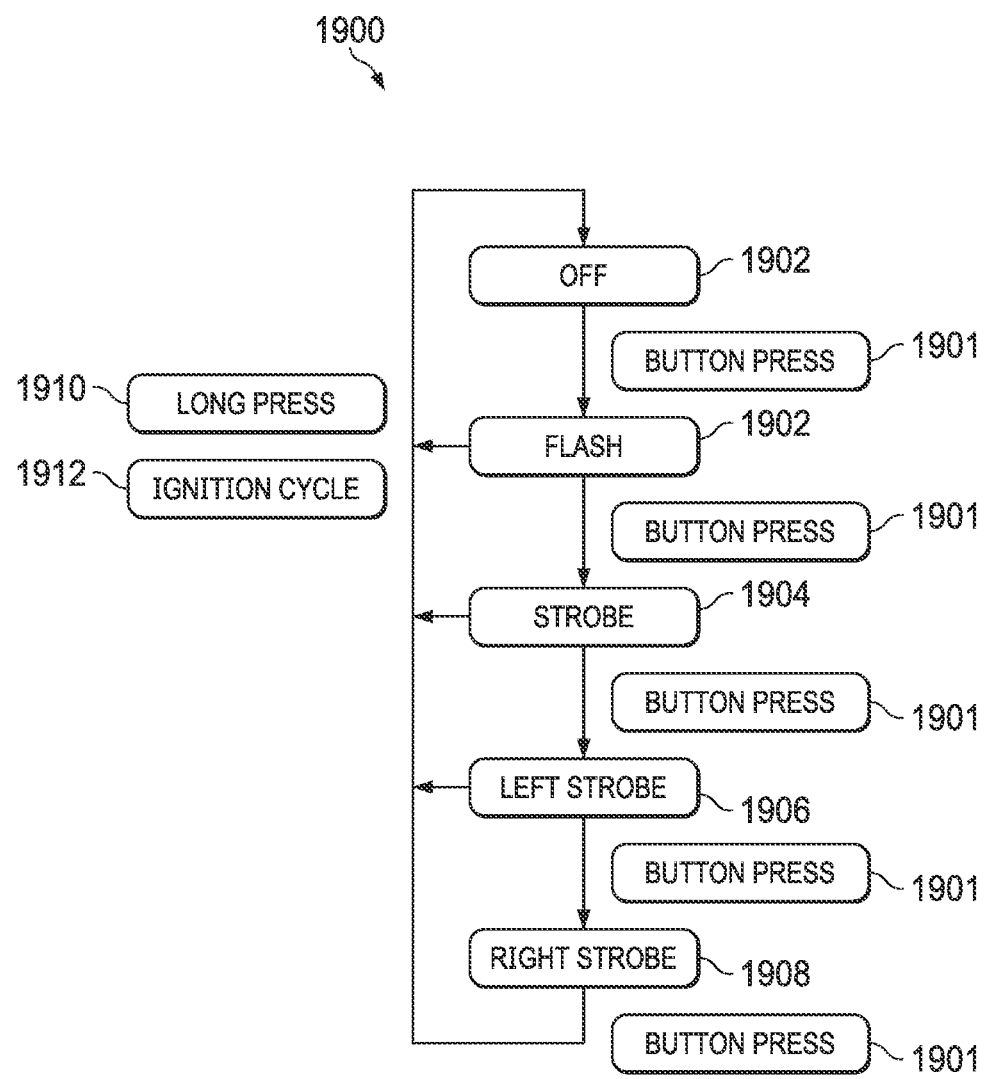

FIG. 19 is a state diagram corresponding to one method of operating a strobe module according to aspects of the present disclosure.

DETAILED DESCRIPTION

In various embodiments of the present disclosure, devices and systems are implemented that provide enhanced visual communication cues via existing or replacement signal and/or hazard lights on an automobile. Signal and hazard lights in most cars cycle between light and dark at a rate between once and twice per second or 1-2 Hz. Such a rate is believed to be adequate for signaling lane changes and other non-emergency situations. However, existing cars and hazard light flasher systems do not take in to account the need for, and benefit of, communicating an emergency situation utilizing an enhanced flash rate. A vehicle traveling 70 miles per hour will travel over 50 feet before a 2 Hz cycle has completed one time. This distance can mean the difference between an accident and a close call. Further, reaction time and ability to maneuver or stop must be taken into account. The quicker a driver takes notice of a problem, the more likely he or she can still have time to avoid a serious accident.

For purposes of the present disclose, an enhanced flash rate is one that is perceptibly altered, or has at least a component of the flashing cycle that is increased in flashing speed, from the high end of the normal flash rate of about 2 Hz. Such flash rate may be referred to as a "strobe" instead of a flash or signal for purposes of the present disclosure. In some embodiments, a strobe has a cycle rate of 3 Hz or above (although slower rates may still be considered "enhanced" or "strobing" so long as there is a perceptible increase in rate over that of a typical signal light). In other embodiments, the strobe rate is 4 Hz or above, representing a doubling of the fastest typical vehicle signal light or hazard light flash rate. It is believed that the faster a light strobes with adequate delineation and contrast between light and dark periods, the more attention grabbing the light is perceived to be. Accordingly, in another embodiment, the strobe rate is 6 Hz, or a factor of three faster than the fastest flash rate expected to be encountered from a standard signal or hazard light. In further embodiments, the strobe rate is 8 Hz or above.

It should be understood that lighting patterns may be produced that comprise strobed illumination (e.g., light and dark cycles repeating at 2 Hz or more) interspersed with longer dark or non-illuminated periods. For purposes of the present disclosure, the term strobe encompasses patterns of flashing lights, part of which are strobing per the definition above, and part of which may be dark or non-illuminated, steady state illuminated (at full or partial maximum output), or flashed at a rate that is slower than a strobe. The term strobe should also be understood to encompass patterns that contain strobing portions of varying frequency. A non-limiting example of such a pattern would start flashing at 2 Hz and increase over time to 8 Hz or more before repeating or moving to another pattern. It should also be understood that, in various embodiments of the present disclosure, signal lights (e.g., left and right signal) are maintained at the normal 1-2 Hz, while emergency or hazard flashers are deployed at a strobing rate or in a strobing pattern. Moreover, as described in detail below, a normal slower flash rate may be optionally available when the hazard flashers are deployed.

Emergency vehicles have been quipped for many years with brightly and rapidly cycling lighting systems. These have been based on complex mechanical systems involving rotating reflectors and the like that increase apparent flash rate beyond what is normally achievable with traditional incandescent based circuitry. Unfortunately, such systems were specialized add on equipment to the basic underlying vehicle, and not normally available or cost effective for the general public to utilize, even for legitimate purposes. Newer systems based on light emitting diodes (LEDs) are available but, again, are specialized equipment, typically added to a vehicle after it leaves the manufacturer, and requiring separate controls, circuitry, and possibly power supplies from what is available from a factory vehicle.

A traditional signal light system for a consumer automobile, and its associated hazard flashing system, has a flash rate on the order of 1-2 Hz. This was originally based in part on the use of incandescent light bulbs in the older systems (typically 6V or 12V bulbs), which rely on internal filaments that heat up and glow in order to operate. The filaments do not glow sufficiently to be able to provide appropriate visual cues until power has been applied a sufficient amount of time. Further, they do not stop glowing instantaneously when power is removed. Thus, the rate at which the signal light or hazard flashers could be cycled was limited. Other limitations existed based on the fact that the original circuitry driving the flashing operation was based on analog thermal switches or other electromechanical components, which could not drive incandescent bulbs much beyond around 2 Hz. For purposes of the present disclosure, an existing vehicle circuit implementing the periodic activation of lights for signaling or hazard indications (whether based on thermal switches or otherwise) is referred to as a flasher module or relay, signal module or relay, or blinker module or relay.

Strobe lights based on exclusively on analog circuitry have been available for some time but require arrangements of transformers to produce voltages on the order of hundreds of volts, capacitors, and delicate gas discharge tubes to operate. Again, none are suitable for consumer use with ordinary automobiles.

LED lighting systems have now made their way to many vehicle models as standard equipment. LED upgrade kits are available for older and newer model cars as well. However, the operation of the LED lighting systems operate in the same manner and provide the same functions that were available with the incandescent lighting systems (albeit at greater efficiency and/or intensity).

In various embodiments, the present disclosure provides systems and methods that are capable of providing strobing effects in existing lighting systems for factory standard automobiles. Such systems and methods rely on existing wiring, LED lights, and controls (switches, etc.). In other embodiments, the systems and methods of the present disclosure are applicable to vehicles produced without LED lights, but which have been upgraded from the basic incandescent bulbs, at least so far lights for which strobing effects are sought. The existing wiring may be employed in such embodiments and the existing controls are utilized. In other words, embodiments of the present disclosure provide for strobing effects of vehicle signal lights, brake lights, or other existing lights to be available to a driver or vehicle occupant and to be operable with existing and familiar hazard light switches or other activation means. Automatic deployment of strobing effects can be tied to signals received from existing vehicle control or safety systems corresponding, for example, to air bag deployment, ABS activation, hard braking, rollovers, etc. It is also possible to add at least some automatic deployment features for older vehicles based on the use of separate accelerometers not present in the existing vehicle systems. Various embodiments of the present disclosure can be installed or implemented at the time of manufacture as factory standard equipment, or entirely as an aftermarket system relying on factory installed controls, wiring, and to the extent possible, existing bulbs.

Figure 1:
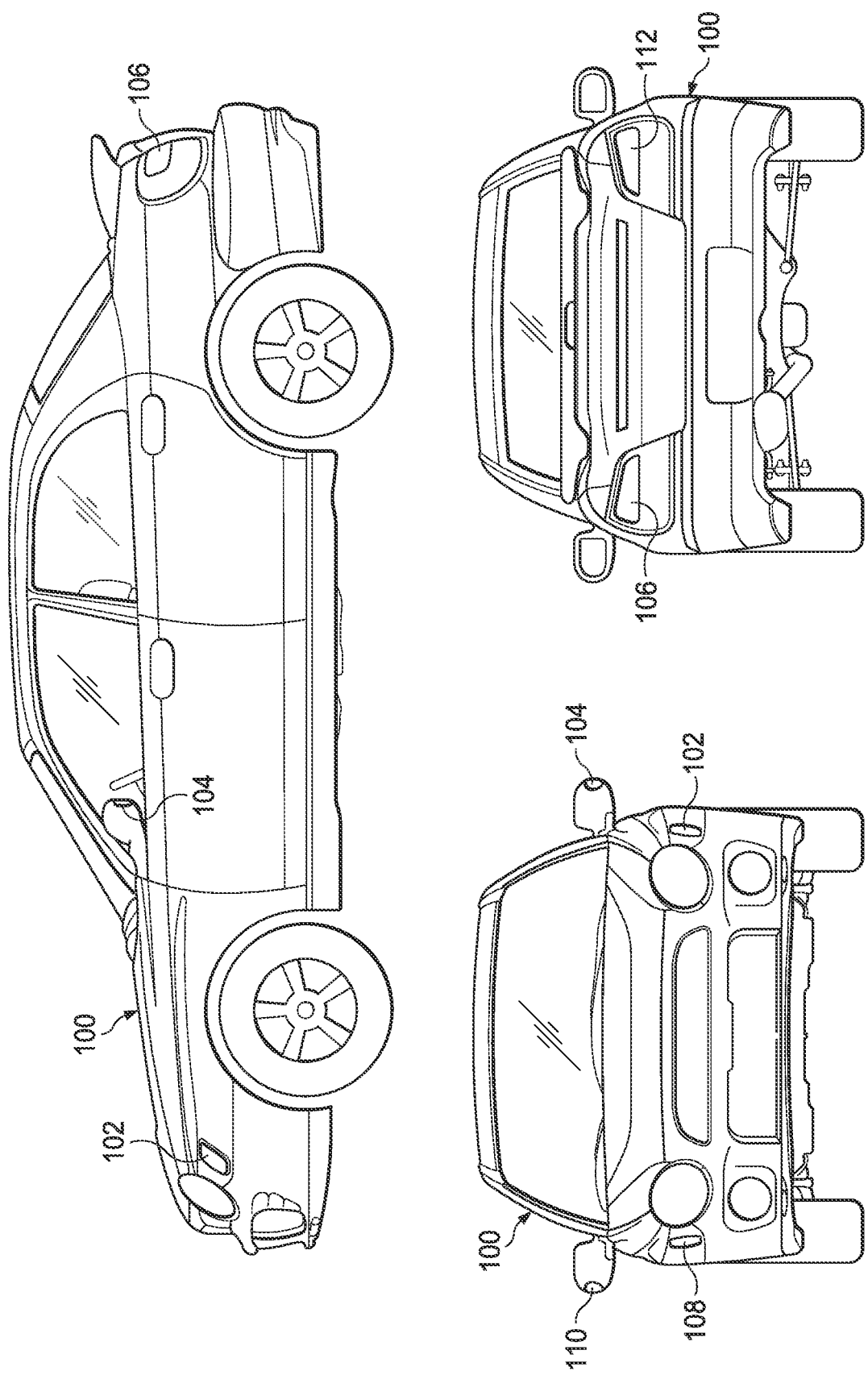
FIG. 1 illustrates an exemplary placement of signal indicators and hazard flashers on a typical vehicle.

Referring now to FIG. 1, exemplary placement of various signal lights and/or hazard lights is shown on a typical automobile 100. It should be understood that the terms automobile, car, and vehicle, are used interchangeable herein, and the systems and methods of the present disclosure are equally applicable to all of these. The terms, lamp, light, indicator, flasher, signal and blinker as used in the present disclosure in the context of the strobing systems presented herein should be understood to mean an LED light placed appropriately on a vehicle or automobile 100 to be visible to other drivers or observers outside the vehicle. FIG. 1 shows the automobile 100 from side, front, and rear views. A left front indicator light 102, left side indicator light 104, and left rear indicator light 106 can be seen at typical locations on the automobile 100. Similarly, along the right side of the automobile 100 are right front indicator light 108, right side indicator light 110, and right rear indicator light 112. It should be understood that the placement of the indicator lights is for illustration only, and the present disclosure is not limited to the placement shown. On most, if not all, available vehicles, the left front indicator light 102 and right front indicator light 108 will generally be toward the front of the automobile 100, visible to facing or oncoming traffic. These are generally forward of left side indicator light 104 and right side indicator light 110 (if the vehicle is so equipped) which are visible from the sides of the automobile 100. The left side indicator light 104 and/or right side indicator light 110 may also be mounted on the body of automobile 100, rather than on the mirrors, or on another location. Finally, left rear indicator light 106 and right front indicator light 108 are generally mounted rearward on the 100 so as to be visible to traffic behind the automobile 100.

As described above, the various indicator lights may be LED lights, or may have originally been incandescent bulbs (or a mixture of the two) that have been changed out for LED lights in order to allow effective strobing as provided by various embodiments of the present disclosure. In various embodiments of the present disclosure, the existing location, placement, and color of lights is retained as the vehicle was manufactured, or would be manufactured, is produced without any of the systems of the present disclosure.

Figure 2A:
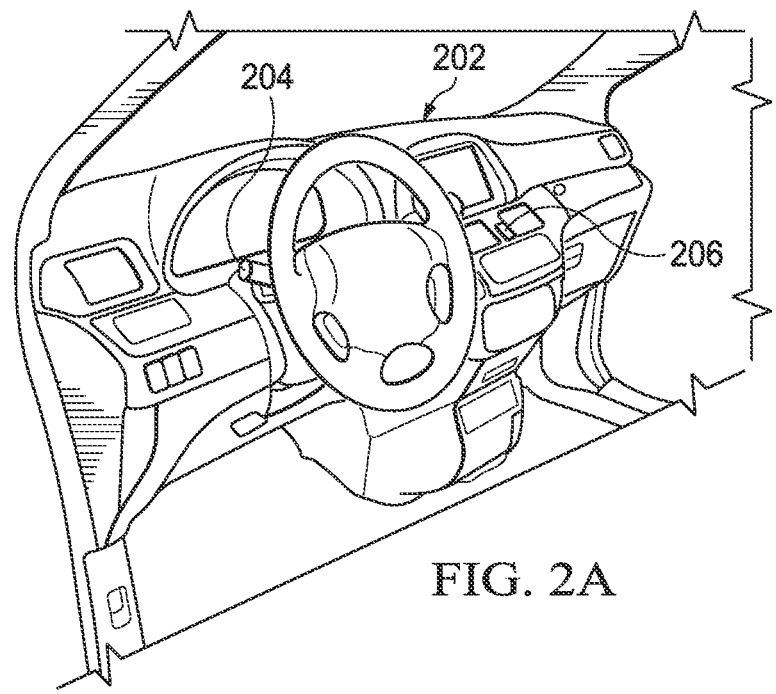
FIG. 2A illustrates an exemplary vehicle dashboard and exemplary placement of certain controls.

Referring now to FIG. 2A, a vehicle dashboard 202 is shown. The dashboard 202 is meant to represent any vehicle dashboard as are widely known to the public. A turn signal stalk 204 is generally provided to the left of the steering wheel and operated to activate signal lights. Normally, movement of the turn signal stalk 204 downward indicates a left hand signal and movement of the turn signal stalk 204 upward indicates a right hand signal. Upon activation and the appropriate signal lights are illuminated in a slow, periodic flashing manner.

A hazard flasher button 206 may be located at various locations on the interior of a vehicle. Here the hazard flasher button 206 is shown in the center of the vehicle dashboard 202 but it could be placed on a steering column, below the vehicle dashboard 202, or elsewhere.

Embodiments of the present disclosure are designed to work with the existing signal and hazard light controls (e.g., the turn signal stalk 204 and hazard flasher button 206) such that a driver or user does not have to learn or remember any separate controls. As described below, some embodiments of the present disclosure allow a selection of various strobe or flashing lights to be implemented. These may be implemented by sequential presses of the hazard flasher button 206. No separate manual controls are needed or provided. Thus, the user is not presented with a confusing array of options or controls during an emergency and does not have to suffer any unwanted modifications that are visible on the interior of the vehicle.

Figure 2B:
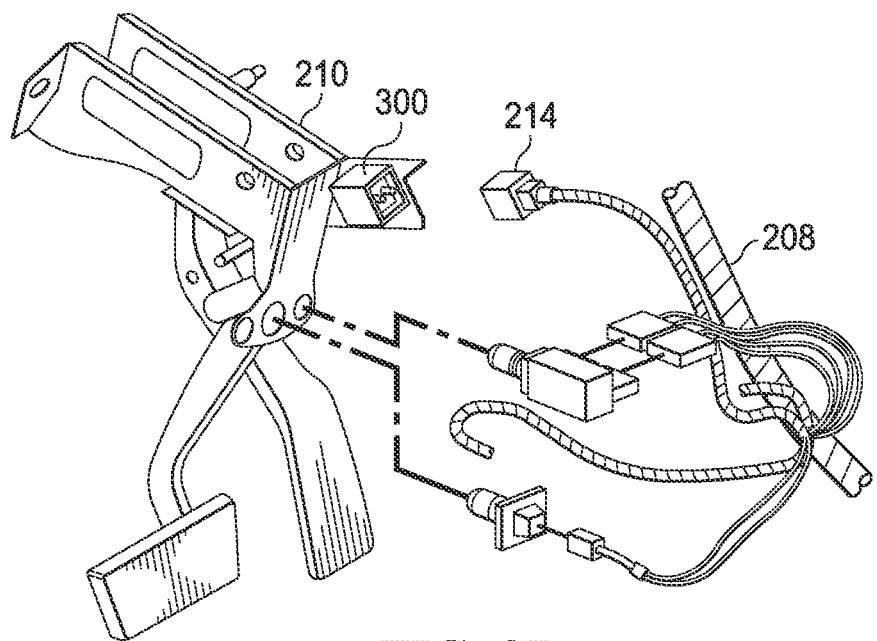
FIG. 2B illustrates an exemplary vehicle wiring harness and location for a strobe module to replace a flash relay.

Referring now to FIG. 2B an exemplary vehicle wiring harness 208 and location for a strobe module to replace a flash relay is shown. The wiring harness 208 is shown as only that portion of the harness that interconnects with a strobe module 300 according to aspects of the present disclosure. It should be understood that the wiring harness may run throughout a vehicle and may be constructed of multiple separate pieces. According to embodiments of the present disclosure, a strobe module 300 replaces an existing flasher relay device and provides a strobing circuit for the hazard lights in an existing vehicle. The strobe module 300 may even be mounted in the same location as the original relay. In some embodiments, the strobe module 300 is pin-compatible with an existing connector 214 on the wiring harness 208 and performs all of the functionality described below relying on the power, signaling, and other connections provided via the wiring harness 208. In other embodiments, an adapter (not shown) may interpose the strobe module 300 and the wiring harness connector 214 such that a single embodiment of a strobe module 300 can be connected to a wide variety of vehicles and wiring harnesses.

In some embodiments, as explained below, the strobe module 300 may not be able to provide the full contemplated functionality interfacing to the vehicle exclusively via the wiring harness 208. In such cases, additional leads may be routed to power, ground, or wherever needed. In embodiments where a body control module (BCM) is present, the strobe module 300 may have little or no interaction to the vehicle via the connector 214, but may be spliced and wired into the vehicle at a convenient location to receive output from the BCM and drive the associated vehicle lights (as described further below).

For purposes of the present disclosure, any electronic or electromechanical mechanical device with control or programmable control (whether or not reprogrammable) over the signal lights or hazard lights of a car is considered a BCM. A BCM may incorporate one or more silicon based processors, microprocessors, controllers, microcontrollers, chips, gate arrays, or other logical devices. In some cases, the BCM may contain relatively complex multifunctional components such as system-on-a-chip devices. Additional names or designators for a BCM may include, but are not limited to, computer, control unit, electronic control unit (ECU) body computer, body computer module, body controller, body control module, and on board controller. The BCM may or may not control additional aspects of the vehicle in addition to hazard or signal lights.

An existing mounting point 210 may be provided on the vehicle for physically locating and affixing the original flasher relay. The same location 210 may be used to store and secure the strobe module 300. In embodiments where the strobe module 300 interfaces with the vehicle at least partially via the wiring harness 208, the mounting point may be near the connector 214.

Figure 3:
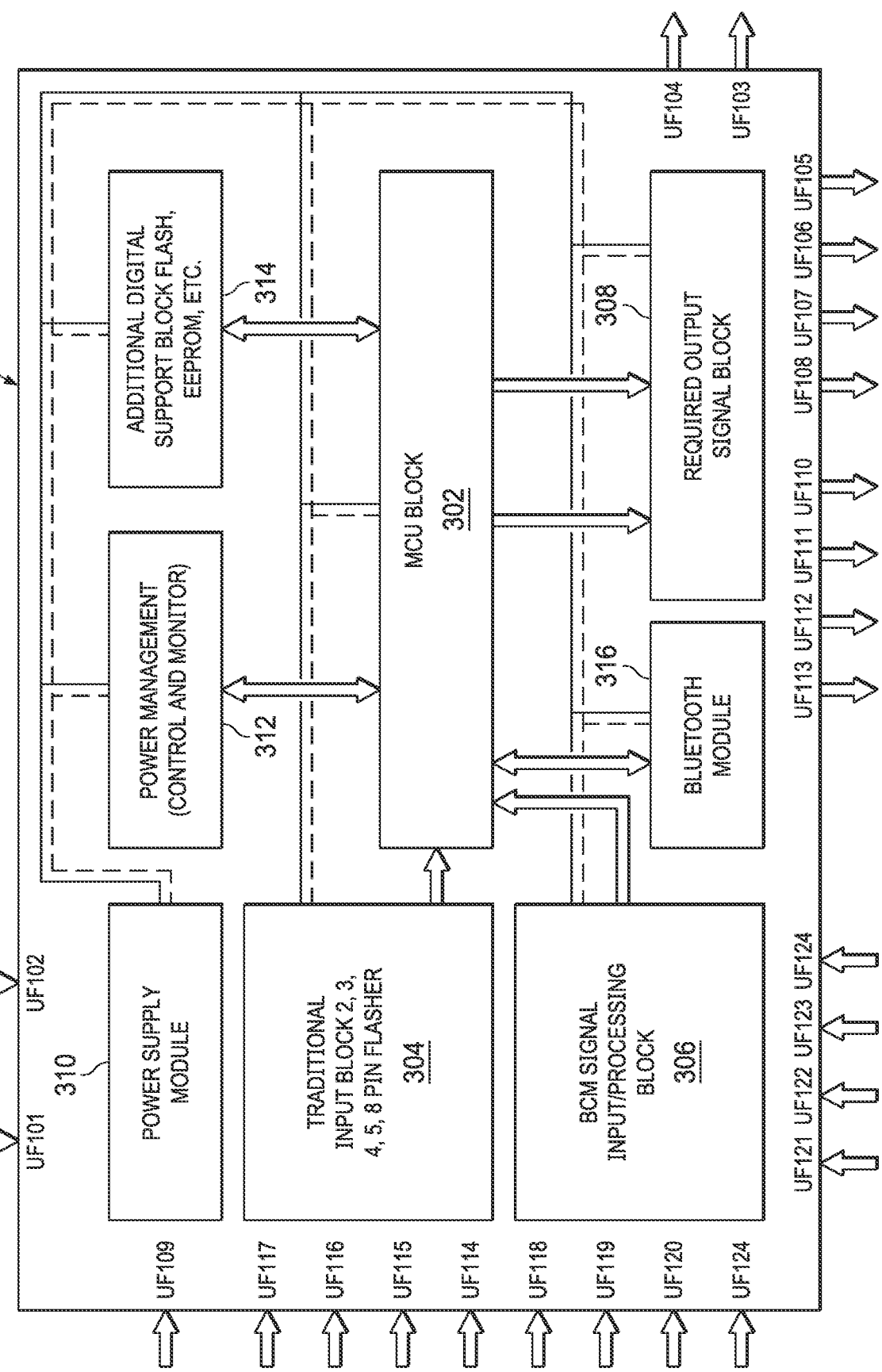
FIG. 3 is a block diagram of a strobe module for vehicle hazard lights according to aspects of the present disclosure.

Referring now to FIG. 3, a block diagram of a strobe module for vehicle hazard lights according to aspects of the present disclosure is disclosed. Arrows in FIG. 3 are indicative of direction of signaling, information, or power flow. In the embodiment of FIG. 3, the primary functionality of the strobe module 300 is provided by a microcontroller 302. The microcontroller 302 may be a general purpose microcontroller that is suitable to the environment in which is it used (e.g., a vehicle interior or engine compartment). The microcontroller 302 may be programmed using, for example, assembly language or a higher level language when suitable. In some embodiments, the microcontroller 302 may be less advanced than a general purpose microcontroller and may comprise a field programmable gate array (FPGA) or the like. An application specific integrated circuit (ASICS) may also be used.

It will also be appreciated that a system-on-a-chip device might be employed to fulfill the functions of the microcontroller 302 as well as providing integrated memory and storage, I/O ports, D/A, A/D, timing functions, and the like. In some cases, wireless communication capabilities may even be provided on a single chip. Such an embodiment is within the scope of the present disclosure and simply moves certain aspects or functions of the strobe module 300 from the various individual components as described herein and consolidates them onto a single silicon device.

In the illustrated embodiment of FIG. 3, the microcontroller 302 receives input from an analog input block 304. The analog input block 304 provides signal connections to those automobiles relying on older or traditional analog blinker or hazard flasher modules. The analog input block 304 provides the appropriate leads and connections to mimic the interface to the automobile of various legacy flasher systems (e.g., via the connector 214). These include, for example, existing 2, 3, 4, 5, or 8 pin flasher schemes. Exemplary detailed wiring diagrams for these systems are explained below. However, in each case, the functionality is similar. The strobe module 300 operates on the basis of the microcontroller 302 reading or accepting the signals or voltages that would normally be provided to the existing flasher module or relay and replicating the appropriate output signal or voltage at output signal block 308, which connects to the downstream electrical components responsible for illuminating the relevant signal light (in many cases, the only existing downstream component will be the bulb or LED that is visible to other drivers). For example, a driver may flip a signal light stalk upward to signal a right turn. This would normally send a signal in the form of a voltage to the flasher relay. In response, the existing signal or hazard module would provide the traditional periodic illumination of the relevant signal lights. A driver may also deploy a hazard light switch, and in response, the existing hazard module would provide periodic illumination of all signal lights. The strobe module 300 replicates this functionality as a replacement for the existing hazard or signal module. However, in the event that hazard lights are activated (as indicated on the analog input block 304), the microcontroller 302 is programmed to deploy the signal or hazard lights in a strobing fashion.

As described, a strobing light appears substantially different than a normal flashing light as have been seen to date on automobiles. However, since strobing lights are attention grabbing devices associated with hazardous conditions, it may be a better choice not to strobe the relevant lights when a simple signal light is indicated on the analog input block 304. Accordingly, the microcontroller 302 may be programmed to flash, rather than strobe, the relevant lights or LEDs when a turn signal is indicated when such a distinction is supported by the existing vehicle wiring.

In some embodiment, the strobe module 300 is deployed or implemented in a newer automobile that may utilize a computer or set of computers that control non-engine related functions referred to as a body control module (BCM). In such cases, the signal stalk and the hazard flasher button may be connected directly to the BCM, which then deploys the signal lights as signal lights (one side only) or as hazard lights (both sides simultaneously). It is possible to implement the systems of the present disclosure by initial programming (or reprogramming where allowed) of the BCM. However, on vehicles that are already built and on the road, access to, and reprogramming of, the BCM is generally time consuming and cost prohibitive to a degree it may not be likely to gain wide acceptance. Further BCM schematics and programming routines are rarely made public. Accordingly, the strobe module 300 may have a BCM input block 306 instead of (or in addition to) the analog input block 304.

The BCM input block 306 may comprise a series of leads that are wired to intercept the outputs from the existing BCM that drives the vehicle signal and hazard lights. When the microcontroller 302 detects that the BCM indicates a signal light, it may utilize the output signal block 308 to activate the relevant lights in the traditional signaling manner. On the other hand, if the microcontroller 302 detects on the BCM input block 306 that the BCM indicates a hazard flash, the output signal block 308 will be used to drive the strobing effect on the exterior lights as described.

The output signal block 308 provides electrical connections to each bulb or LED that forms an existing part of the signal or hazard flasher system of the automobile into which it is installed. Such connections may include connections to lights visible outside the car, as well as indicator lights visible to the driver. The microcontroller 302 may or may not have the capacity to directly drive the LEDs comprising the flasher or signal system of the car. Consequently, as is known in the art, amplifiers, relays, or other circuitry that is capable of driving the LEDs in the required manner may comprise the output signal block 308, which, in turn, drives the LEDs.

A power supply module 310 may be integrated with the strobe module 300 to power the microcontroller 302, output signal block 308, and/or other components. The power supply module may be configured to draw power from the existing 12 volt system of the vehicle. In another embodiment, it may draw power from a regulated accessory bus (e.g., 5 V, 12 V, or other).

Power management circuitry 312 may be provided for converting voltage from that received by the power supply module 310 to that utilized by the other components of the strobe module 300. The power management circuitry 312 may also prevent power surges or spikes from reaching the microcontroller 302 and other sensitive components. In some embodiments, battery back-up may be provided the microcontroller 302. Where space and/or battery capacity permit, a backup battery could even drive the LEDs via the output signal block 308 when the vehicle electrical system becomes exhausted or fails due to damage sustained, for example, in a crash.

The microcontroller 302 may be configured to communicate with various existing vehicle subsystems for automatic deployment of strobing lights. For example, in the event of an air bag deployment, the emergency lights may be set to strobe. Similarly, if a deployment of an anti-lock brake system or stability system is detected, the microcontroller 302 may activate strobing lights. In some embodiments, deactivation of the strobing lights may be automatic as well based on information received from other vehicle subsystems.

In other embodiments, the strobe module 300 has one or more on-board (not presently shown) accelerometers that detect rapid acceleration (or deceleration), skids, overturns, and other non-typical driving maneuvers and can deploy strobing lights without input from the driver. The microcontroller 302 can be programmed such that the strobing ceases automatically upon resumption of a normal speed or orientation for the vehicle, or they may remain activated until the microcontroller 302 is reset (for example, by a press of the hazard light switch by the driver or occupant).

In some cases, it may be desirable to allow reprogramming of the microcontroller 302 after installation. Accordingly, the strobe module 300 may be equipped with a wireless module 316. The wireless module 316 may be a Bluetooth module that can communicate in an ad hoc fashion with a variety of devices. The wireless module 316 could also be an IEEE 802.11 or "WiFi" enabled chip to take advantage of the WiFi network provided by some newer cars or mobile hotspots. The wireless module 316 can allow reprogramming of the microcontroller 302 even if the strobe module 300 is installed in a location in the vehicle that is difficult to access.

The wireless module 316 may also be used to interface with Bluetooth.® equipped LED modules installed in place of original incandescent LED signal or flasher lights. In such embodiments, the LED lights may behave as customary flashing signal or hazard lights unless instructed via the wireless module 316 to strobe. Naturally, such a solution requires additional circuitry at each LED or bulb location and may be more cumbersome to install and maintain. However, such a configuration would have the advantage of allowing the existing signal and hazard light switch gear to remain in place. In such an embodiment, some or all of the output signal block 308 of the strobe module 300 may be eliminated and the wiring passing to the signal or hazard lights may simply be a pass-through arrangement. The input for the microcontroller 302 may then be gathered from the analog input block 304 and/or BCM input block 306. A simple determination of which line or signal was active would be all that is needed in such an embodiment since the signal is passed "downstream" to the lights. The microcontroller 302 still determines whether to deploy a strobe or traditional flash based upon detection of whether a signal or hazard light was indicated. Further, in this and other embodiments, various capacities of the strobe module 300 might be turned on or off by a user via the wireless module 316.

Figure 4:
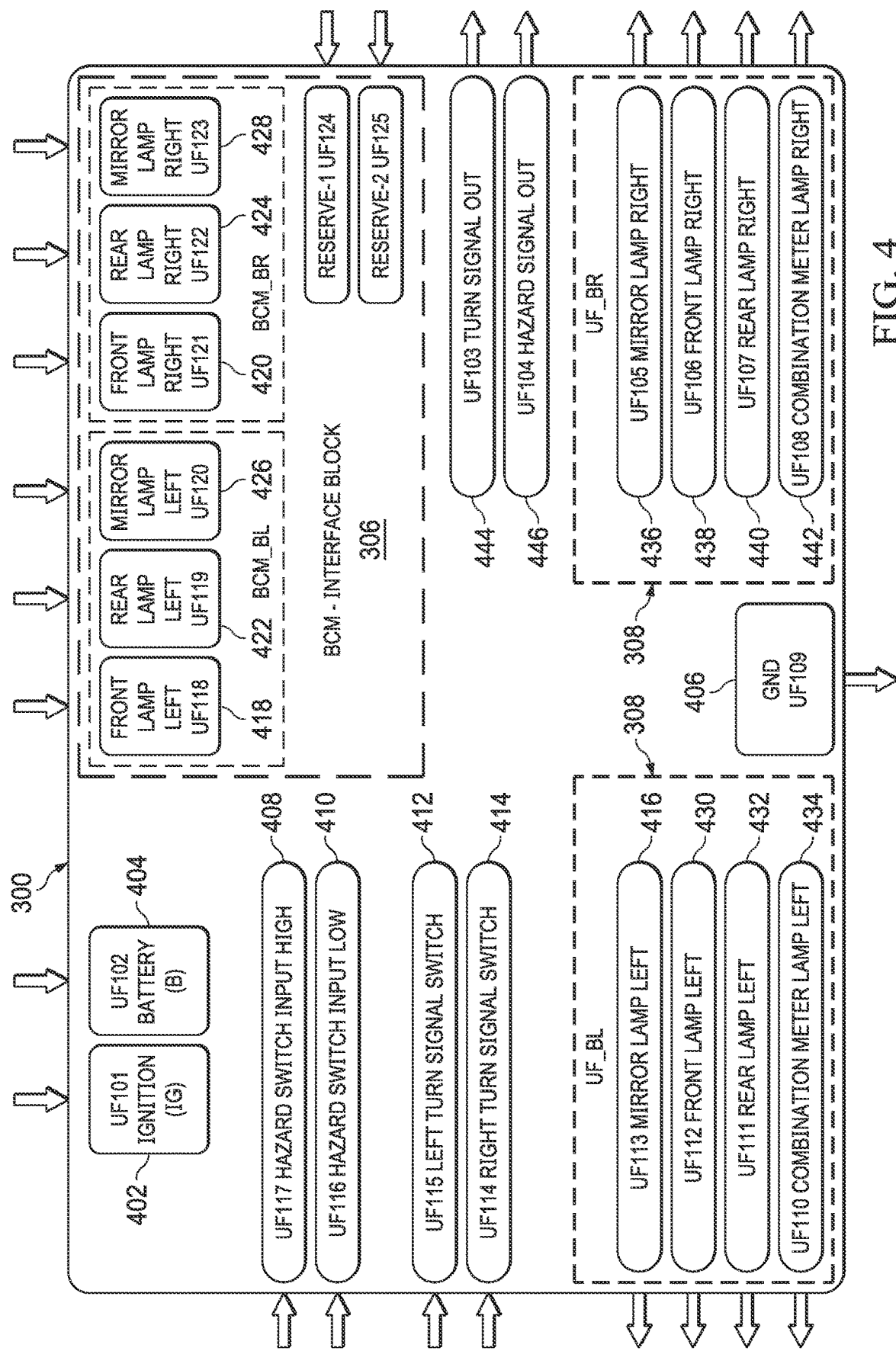
FIG. 4 is a schematic diagram input/output diagram of a strobe module according to aspects of the present disclosure.

Referring now to FIG. 4, a schematic input/output diagram of the strobe module 300 according to aspects of the present disclosure is shown. In FIG. 4, arrows around the periphery of the strobe module 300 indicate whether the associated connection is an input or output. For example, inputs received from existing vehicle controls (e.g., hazard switch input high 408) are shown with an inward facing arrow.

It will be appreciated that a number of existing vehicle signal and hazard light wiring schemes are in existence, whether on an analog basis or on the basis of utilizing a newer BCM. Accordingly, in order to work with a wide array of vehicles, various embodiments of the present disclosure may have different pinouts and wire compatibilities. In some embodiments, leads that are not used are simply ignored. However, where it is more economical to do so, various embodiments of the present disclosure may be built with only the ports, pins, and wiring needed for the immediate application for which it is intended. In such case, a fit-list might be developed alongside that specifies, for particular embodiments, those makes and models of vehicle with which it is compatible. After describing the inputs and outputs that are available, a number of examples are given below as to how various embodiments of the present disclosure are adapted to work with various wide spread wiring schemes currently in existence.

An ignition connection 402 may be provided as a part of the power supply module 310. The 202 provides indication to the microcontroller 302 that the vehicle is switched on (normally, signal lights do not deploy when the vehicle ignition is off, but hazard lights do). A separate connection to power, battery connection 404 is also provided and allows for deployment of certain function (e.g., strobing hazard lights) when the ignition of off. The ignition connection 401 may also be part of the power supply module 310. A ground lead 406 is also provided. In some embodiments, ground is provided via the connector 214, but in other embodiments, it is a separately attached lead to the strobe module 300.

Forming a part of the analog input block 304 may be leads or connections for hazard switch input high 408, hazard switch input low 410, left turn signal switch 412, and right turn signal switch 414. Two hazard switch input options are provided to account for the fact that in some existing systems the existing relay is activated by providing a high voltage to the relay. In others, the activation lead remains high unless the relay is to be deployed to flash the hazard lights. In such case, a ground or low voltage signal indicates hazard deployment. By providing both hazard switch input high 408 and hazard switch input low 410 leads, the strobe module 300 is compatible with both types of systems.

The strobe module 300 can be programmed to be capable of multiple flashing and strobing patterns. For example, a single press of the existing hazard switch might be intended to signal the traditional slow cycling flash. A second press would be intended to select a high speed strobe. Therefore when various embodiments of the strobe module 300 are installed, a driver or passenger can deploy hazard lights in the manner in which they are accustomed. This also eliminates the need for separate switches or controls to gain full functionality of what is considered a vehicle safety system.

Hazard switches on certain vehicles provide two discrete positions (high and low). Typically, hazard flashers in such systems are deployed when the button is pressed and then remains depressed. Such switches actually activate the existing flasher relay by operating as a power switch. A second press releases the switch to the high position and depowers the hazard lights. The strobe module 300 may still be configured to operate with such systems, even so far as providing both flashing and strobing, or multiple strobing patterns. The strobe module 300 in such case may be programmed to "count" the number of presses, or transitions from on to off and vice versa provided via the legacy two-position switch. Relying on the battery connection 404 and/or the on board battery to keep the microcontroller 302 and other components powered the strobe module 300 provides the programmed or desired operations notwithstanding that the existing relay may have been powered only by the power flowing through the existing switch.

The lead for the left turn signal switch 412 and the right turn signal switch 414 act to inform the strobe module 300 when left or right turn signals are activated. As described above, the strobe module 300 may activate the left or right turn signals in response to movement of the existing turn signal stalk in a manner that replicates the existing slower flash of the turn signals, or a strobing flash.

In embodiments where the strobe module 300 interfaces with a BCM the BCM input block 306 provides a front left lamp input 418 and a front right lamp input 420. A rear left lamp input 422 and rear right lamp input 424 are also provided. If the vehicle is so equipped a left mirror lamp input 426 and right mirror lamp input 428 may be provided as well. Since the BCM controls input or interface with the driver (e.g., via the turn signal stalk) the strobe module 300 may not receive any direct indication of the stalk position, nor of the position of the hazard light switch. Instead the strobe module 300 may infer what the driver is doing based upon these inputs from the BCM. For example, if lights on one side or the other of the vehicle are activated based on the BCM inputs, the strobe module 300 simply replicates those outputs via the output signal block 308. On the other hand, where lights for both sides of the vehicle are activated at once, the hazard lights have been deployed. The strobe module 300 will then use the output signal block 308 to effect a strobe on the vehicle's signal lamps.

For ease of understanding, in FIG. 4, output signal block 308 is shown split into left and right components or left and right LED groups. Lights associated with the left side of the vehicle may be controlled by a left mirror lamp output 416, a front left lamp output 430, a rear left lamp output 432, and/or a combination meter left output 434. The output signal block 308 has a similar set of outputs for the right side of the vehicle including a right mirror lamp output 436, a right front lamp output 438, a rear right lamp output 440, and/or a combination meter right output 442. It is understood that not all of these outputs will be employed in every installation or in every embodiment of the strobe module 300. For example, if a vehicle does not have a lamp associated with the left hand mirror, the left mirror lamp output 416 will be absent, or simply left unconnected. It is also understood that each of these outputs are equipped with whatever additional circuitry is needed to adequately drive the associated LEDs being activated.

The strobe module 300 also provides two additional signal outputs that are utilized with certain existing vehicle wiring systems as will be explained below. These include a turn signal out indicator 444 and a hazard signal out indicator 446. The signals output on the turn signal out indicator 444 and hazard signal out indicator 446 are controlled by the microcontroller 302 as with the other outputs.

Referring now to FIG. 5, a wiring diagram of a two-pin flasher system is shown. The system shown in FIG. 5 is an existing two-pin flasher system and is denoted as such in the present disclosure by virtue of the fact that the existing hazard flasher 506 interacts with the remainder of the system via only two-pins as explained herein. In the present case, the two pins represent an input from power and an output to the light or lights to be flashed. It should also be understood that other configurations for two-pin flasher systems may also exist. The system of FIG. 5 utilizes a pair of similar thermal cycling switches 504, 506 that control turn signals and hazard flashers, respectively. The turn signal flasher 504 may connect to power via fuse box 502 and be wired such that power is available only when the associated vehicle ignition switch is turned on. The hazard flasher 506 may be connected to fuse panel 502 such that power is continuously available to the hazard flasher 506. Activation of the hazard flasher may be controlled by switch 501 which begins thermal cycling of the hazard flasher 506 providing power and illumination to left rear lamp 106, left front indicator light 102, right front indicator light 108, and right rear indicator light 112. An instrument cluster 510 may be provided with a left turn indicator 512 and a right turn indicator 514. When the circuit has been placed under control of the hazard flasher 506 by the switch 501, both of the turn indicators 512, 514 may flash periodically in unison. Where the turn signals are also utilized as hazard flashers, a multi-function switch 500 may be provided for turning on and off the turn signal flasher 504 as well as directing current to the appropriate lamps on the right or left side of the vehicle.

Figure 6A:
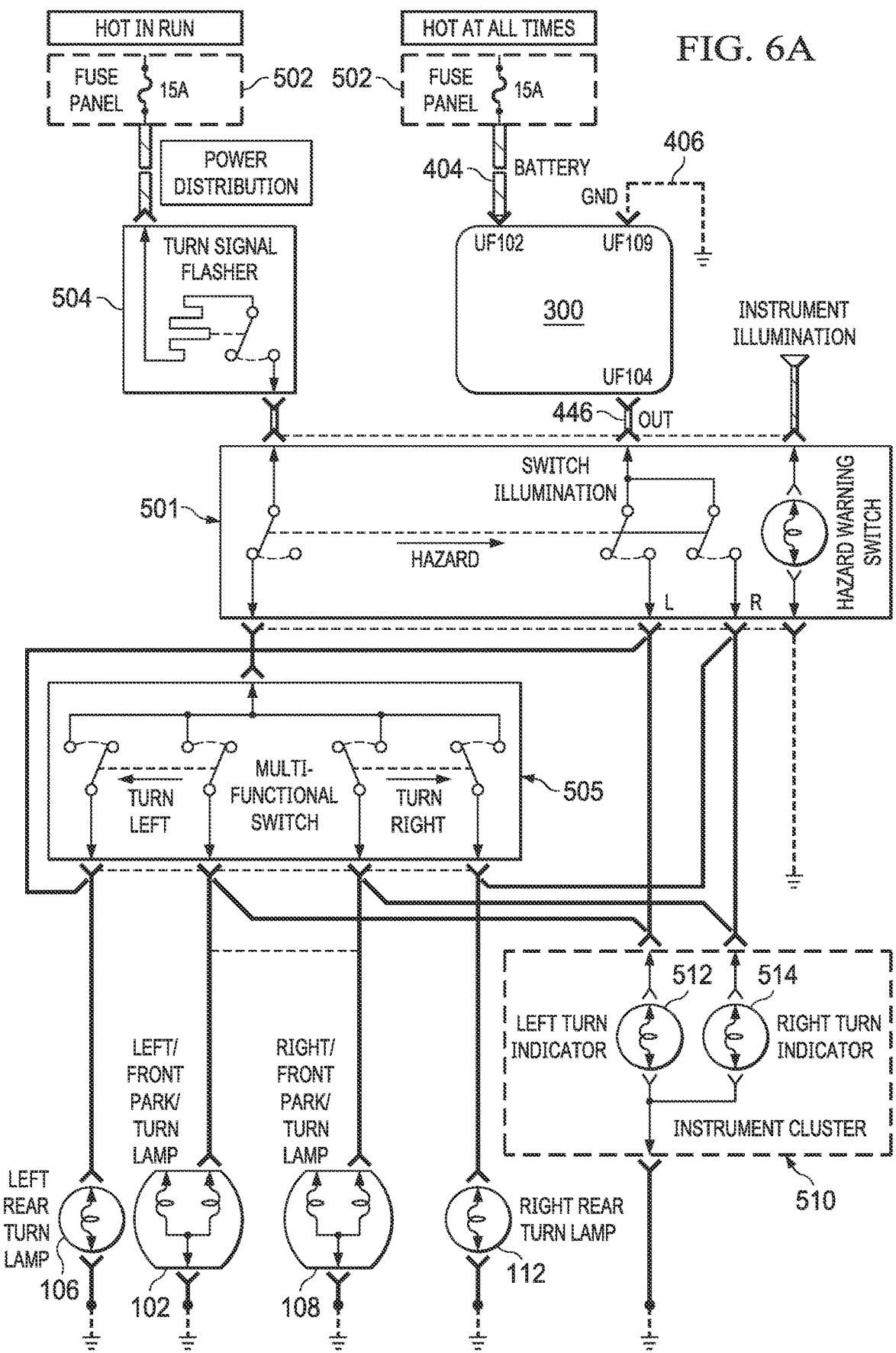
FIG. 6A is a wiring diagram showing an embodiment of a strobe module according to aspects of the present disclosure installed into the generic two-pin flasher system of FIG. 5.

Referring now to FIG. 6A, a wiring diagram showing an embodiment of a strobe module 300 according to aspects of the present disclosure installed into the two-pin flasher system of FIG. 5 is shown. Here the existing thermal hazard flasher 506 has been replaced with the strobe module 300 of the present disclosure. As mentioned above, the strobe module 300 in the present embodiment interacts with the existing system via only two-pins. In the present embodiment, the additional the ground lead is utilized 406. The remaining inputs and outputs of the strobe module 300 (e.g., described with respect to FIG. 4) may be left unused or the strobe module 300 may be manufactured only with the inputs and outputs needed. In the configuration of FIG. 6A, when the hazard switch 501 is activated, the strobe module 300 will drive the signal lamps at a strobing rate previously described. Thus, in the present configuration, the strobe module 300 stands in for the replaced hazard flasher 506.

Figure 6B:
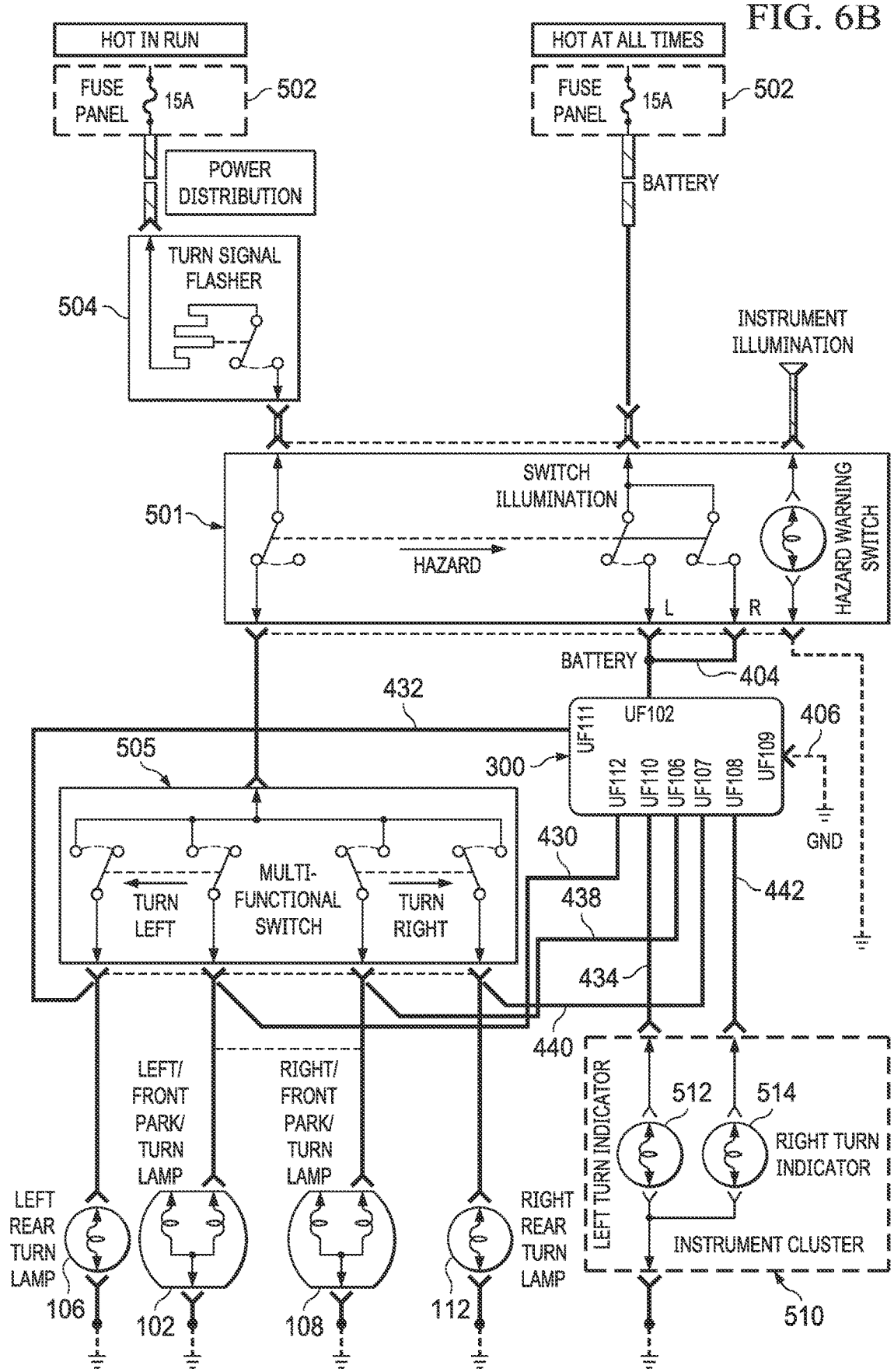

Referring now to FIG. 6B, a wiring diagram showing an embodiment of the strobe module 300 installed differently into a two-pin flasher system is shown. One advantage of installing the strobe module 300 in the manner shown in FIG. 6B is that the strobe module 300 is only connected to battery power when activated by the hazard switch 501. This can prevent a potential drain on the vehicle battery that could result from the continuous operation of the internal microcontroller and other components of the strobe module 300. Here, outputs from the switch 501 selectively connect the battery connection 404 of the strobe module 300 to the power. When the strobe module 300 in the present configuration is provided with power, the front left lamp output 430, rear left lamp output 432, front right lamp output 438, and rear right lamp output 440 are utilized to drive the individual respective front and rear turn signals rather than driving all of them simultaneously via the hazard signal out indicator 446 (which is unused in the configuration of FIG. 6B). Left meter output 434 may be utilized to drive the left turn indicator 512 and the right meter output 442 may be used to drive the right turn indicator 540.

Referring now to FIG. 7A, a wiring diagram of a three-pin flasher system is shown. It should be understood that the three-pin flasher system of FIG. 7 is only an example and that other three-pin flasher systems may exist. In the three-pin flasher system, the existing flash relay 706 provides cycling power on an output based upon a setting of an ignition switch 702 and a hazard switch 701. Three-pin flasher systems generally provide at least a front left turn signal 102, a rear left signal 106, a front right signal 108, and a right rear signal 112. A turn signal indicator 710 may also be provided. Under normal operation the turn signals are controlled by the turn signal switch 705 which may comprise a turn signal stalk next to a steering wheel. When power is on at the ignition switch 702, the left or right side signal lights may be periodically activated via the flash relay 706. The hazard switch 701 may be utilized to provide a cyclic flash via the flash relay 706 to all of the signal lights.

Referring now to FIG. 8, a wiring diagram showing an embodiment of a strobe module 300 according to aspects of the present disclosure installed into the three-pin flasher system of FIG. 7 is shown. Here, the flash relay 706 has been replaced by the strobe module 300 of the present disclosure. The battery lead 404 is connected to the hazard switch 701 and the signal out indicator 444 and the hazard signal out indicator 446 are connected both into the relay system of the hazard switch 701 and the turn signal switch 705. This allows the strobe module 300 to serve as the provider of both strobing effects when the hazard switch 701 is activated as a signaling light provider when the turn signal switch 705 is activated.

Referring now to FIG. 9, a wiring diagram of a four-pin flasher system is shown. With the four-pin flasher system the existing flasher device 906 interacts with the remainder of the system via four separate pins. The system of FIG. 9 is more complex than those previously discussed and a single switch 901 may be utilized to activate both signal lights and hazard lights. This may be powered via a fuse block 902 providing both full time power and intermittent power based on the position of the ignition switch. Some four-pin flasher systems utilize two left front turn signals or indicator lights 102 and two right front turn signals or indicator lights 108. Single right rear turn signals 112 and left rear turn signals 106 are utilized. Each of these may be wired into the combination switch 901. However, the flashing of the signal lights is controlled by the existing flasher 906.

Referring now to FIG. 10, a wiring diagram showing placement of the strobe module 300 of the present disclosure into the four-pin flasher system of FIG. 9 is shown. Here, the strobe module 300 is connected via the combination switch 901 both on the ignition connection 402 and the battery connection 404. Indication to activate hazard lights by the combination switch 901 activates both the battery connection 404 and the ignition connection 402 of the strobe module 300. In turn, the strobe module 300 provides a strobing signal on hazard signal out indicator 446. The hazard signal out indicator 446 having been connected in place of the previous flash output will cause the associated signal lights to be driven in the previously described strobing fashion.

Referring now to FIG. 11, a wiring diagram of a five-pin flasher system is shown. Five-pin flasher systems provide five-pin connections to an existing flasher module 1106. As of previous embodiments a fuse box 1102 may be connected to the existing flasher module 1106 to provide power both when the ignition is on, as well as a full time connection. The existing flasher module 1106 controls the flashing of both the turn signals and the hazard flashers based on position information received from a multi-function switch 1105. The multi-function switch 1105 provides selective power to some or all of the left front signal light 102, the right front signal light 108, the left rear signal light 106, and the right rear signal light 112.

Referring now to FIG. 12, the five-pin flasher system of FIG. 11 is shown with the strobe module 300 of the present disclosure inserted therein. The strobe module 300 takes the place of the flasher module 1106 of the existing system. When the ignition connection 402 and the battery connection 404 are both powered, the strobe module 300 provides strobing outputs on the hazard signal output 446 and may provide a signal output on the turn signal output 444. As before, the multi-function switch 1105 is wired to determine which of the signal lamps receive the respective signal from the strobe module 300.

Referring now to FIG. 13, a wiring diagram of an eight-pin flasher system is shown. The eight-pin flasher system of FIG. 13 interacts with the existing flasher relay 1306 via eight separate pins. A turn switch 1305, which may be associated with a steering column mounted stalk, signals to the existing flasher relay 1306 whether a left or right turn signal has been activated. The existing relay then provides the appropriate flashing output on either the left or right side signal lights. A separate hazard flasher switch 1301 indicates to the existing flasher relay 1306 when a hazard condition has been signaled in the flasher relay 1306 illuminates all of the signal lights in the traditional flashing manner.

Referring now to FIG. 14, a wiring diagram showing the eight-pin flasher system of FIG. 13 equipped with a strobe module 300 according to aspects of the present disclosure is shown. Here, the strobe module 300 is connected to an ignition power switch via ignition connection 402 and is connected to the battery via battery connection 404. The ground connection 406 is also utilized. Outputs from the existing turn signal switch 1305 are provided in the case of the left turn signal to the left turn signal switch input 412 and in the case of the right turn signal to the right turn signal input 414. The separate hazard switch input low 410 is provided since the shown eight-pin flasher system activates the hazard flasher by grounding the pin. Based upon the signal received on inputs 412, 414, 410 the strobe module 300 acts either as a turn signal activating only the left or right side lights or acts as a flash module and provides a strobing output on all of the signal lights. These may include left side lamps 102, 104, 106 and right side lamps 108, 110, 112. It will be appreciated that the strobe module 300 may have outputs dedicated to each of the individual lamp positions as previously described. These may each be used or only one may be used for each side of the vehicle.

Referring now to FIG. 15, a wiring diagram of a flasher system controlled by a BCM is shown. As previously described, BCM systems are not necessarily well documented. However, based on functions provided by various BCMs, certain internal components are known (for example, as shown, interior to BCM 1510). Typically a BCM will receive inputs both from a hazard switch 1506 as well as turn signal indicators. Left side outputs 1512 controls the left side lamps 102, 104, 106 and a right side output 1514 may control right side lamps 108, 110, 112.

Referring now to FIG. 16A, a wiring diagram showing the strobe module 300 of the present disclosure installed in a BCM system is shown. In the installation of FIG. 16A the strobe module 300 may be required to be separately connected to the ignition by the ignition connection 402 and to the battery by the battery connection 404. The strobe module 300 then intercepts the output from the BCM 1510 to determine when signal lights or hazard lights have been activated. All or only part of the connections available on the BCM input block 306 may be utilized. These may include a front left lamp input 418, a rear left lamp input 422, a left mirror lamp input 426, as well as the corresponding inputs on the right side of the vehicle such as the front right lamp input 414, the rear right lamp input 422, and the right mirror lamp input 428. Similarly, depending upon the particular configuration all or perhaps only some of the lamp driving outputs of the strobe module 300 may be utilized. For example, regarding the left side of the vehicle, the left mirror lamp output 416, the front left lamp output 430, the rear left lamp output 432, and/or the meter output 434 may be utilized. With regard to the right side of the vehicle, the right mirror lamp output 436, the right front lamp output 438, the right rear lamp output 440, and/or the meter output 442 may be utilized. Lamps may include but are not limited to the left front lamp 102, left mirror lamp 104, and left rear lamp 106. On the right side, the lamps may include but are not limited to the front right lamp 108, the front mirror lamp 110, and the right rear lamp 112.

Referring now to FIG. 16B is a wiring diagram showing an embodiment of a strobe module installed into the BCM controlled flasher system of FIG. 15 via modification of a microcontroller. As previously described, and as known to those of skill in the art, the BCM 1510 may comprise one or more microcontrollers or central processing units 1602. The CPU 1602 may execute the logic associated with the various functions of the BCM including, but not limited to, operation of the signal lights and hazard lights. Here, the BCM 1602 is configured to directly control the strobing functions of the hazard lights as described herein (in contrast to the system of FIG. 16A where the strobing functions are implemented "downstream" of the BCM). This may be accomplished by an auxiliary chip 1604 that may contain memory and instructions for proper timing of the hazard lights (e.g., a strobe effect or effects). Such an auxiliary chip 1604 may be wired to the BCM 1602 directly or may communicate with the BCM 1602 via a bus (not shown) such as a controller area network (CAN) bus (many vehicles today are already equipped with a CAN bus). In another embodiment, additional chips or memories are not needed as the BCM 1510 contains all of the necessary logic and timing information to drive the vehicle lights in a strobing fashion in response to inputs from the hazard switch and/or signal stalk.

It should be understood that the various configurations described above and illustrated in FIGS. 5-16B employing various embodiments of strobe modules according to the present disclosure are illustrative only, and should not be taken as exhaustive. One of skill in the art can develop additional configurations employing the functions and abilities of various embodiments of strobe modules (e.g., strobe module 300) described herein.

In operation, once installation is complete, and depending upon the existing vehicle circuitry and the limitations inherent therein, more than one strobe pattern may be accessed and activated by the driver or user. For example, upon an initial activation of the strobe module 300 in the context of deployment of a hazard switch, the strobe module 300 may be programmed to flash in the traditional manner (e.g., with a cycle of about 2 Hz). A second press of activation of the vehicles hazard switch (e.g., hazard switch 206 of FIG. 2) may result in the strobe module switching from a slow cycle to a strobing cycle (e.g., around 8 Hz). Further options can be embedded or programmed into strobe module (e.g., using the microcontroller 102) such as strobe pattern that moves from right to left or vice versa. One such pattern is illustrated in FIG. 17 where the left side lights strobe briefly and then cease while the right side lights strobe slightly longer before the cycle repeats. This is suggestive that traffic or other observers of the hazard lights should move to the right. A similar pattern can be developed to suggest movement to the left as shown in FIG. 18.

An exemplary state diagram corresponding to the operation of the strobe module 300 is shown in FIG. 19. In some embodiments, continued presses of the hazard switch are needed to cycle the strobe module, as shown in FIG. 19. An off state is shown at 1902. A single button press 1901 or switch throw (e.g., deployment of the hazard switch 206) may move the strobe module 300 to a traditional flashing configuration 1902. From here, another press 1901 moves the strobe module 300 to a strobe 1904. In some embodiments, further presses 1901 move the module 300 to a right to left strobe 1906 and a left to right strobe 1908. However, depending upon the switch gear available in the existing vehicle into which the strobe module 300 is installed, a single, long press 1910 of the hazard switch may be used to reset the strobe module to off 1902 from any other state. In another embodiment, cycling or interrupting the power supply to the strobe module through the ignition (e.g., ignition connection 402) may be employed to "reset" the strobe module 300.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising of two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A system comprising:
   a set of signal lights comprising:
      a left front signal light positioned on a left front of a vehicle;
      a right front signal light positioned on a right front of the vehicle;
      a left rear signal light positioned on a left rear of the vehicle; and
      a right rear signal light positioned on a right rear of the vehicle;
   a wiring harness wired to activate each one of the set of signal lights;
   a signal light stalk connected to the wiring harness to active either the left front and left rear lights as a left turn indicator at a first flash rate, or the right front and right rear lights as a right turn indicator at the first flash rate; and
   a hazard switch connected to a microcontroller that utilizes the wiring harness to activate each one of the set of signal lights simultaneously at a second flash rate that is perceptibly faster than the first flash rate;
   an accelerometer in communication with the microcontroller; wherein the microcontroller strobes the set of signal lights, at the second flash rate that is perceptibly faster than the first flash rate, simultaneously in response to receipt of a signal from the microcontroller indicative of non-typical driving; wherein the non-typical driving includes rapid deceleration.

2. The system of claim 1, wherein the switch connected to the wiring harness to activate the set of signal lights at the second flash rate that is faster than the first flash rate is a part of the signal light stalk.

3. The system of claim 1, wherein second flash rate is higher than 2 Hertz.

4. The system of claim 1, a wherein the microcontroller interposes the signal light stalk and the switch, wherein the microcontroller controls operation of the set of signal lights via the wiring harness based on a position of the signal light stalk to active the left front and left rear lights as the left turn indicator at the first flash rate, and to activate the right front and right rear lights as the right turn indicator at the first flash rate.

5. The system of claim 4, wherein the microcontroller comprises a body control module associated with the vehicle.

6. The system of claim 1, wherein the second flash rate is perceptibly faster than the first flash rate to a human observer.

7. The system of claim 6, wherein the second flash rate comprises a plurality of flash rates.

8. A system comprising:
   a set of signal lights comprising:
      a left front signal light positioned on a left front of a vehicle;
      a right front signal light positioned on a right front of the vehicle;
      a left rear signal light positioned on a left rear of the vehicle; and
      a right rear signal light positioned on a right rear of the vehicle;
   a wiring harness configured to selectively activate each one of the set of signal lights;
   a signal light stalk connected to the wiring harness to active either the left front and left rear lights as a left turn indicator at a first flash rate, or the right front and right rear lights as a right turn indicator at the first flash rate;
   a hazard switch connected to the wiring harness to activate the set of signal lights as hazard lights at the first flash rate; and
   a control connected to a microprocessor utilizing the wiring harness to activate the set of signal lights as increased visibility lights with a flashing pattern, at least a portion of which has a second flash rate that is perceptibly faster than the first flash rate;
   an accelerometer in communication with the microprocessor; wherein the microprocessor strobes the set of signal lights, at the second flash rate that is perceptibly faster than the first flash rate, simultaneously in response to receipt of a signal from the microprocessor indicative of non-typical driving; wherein the non-typical driving includes rapid deceleration.

9. The system of claim 8, wherein the microprocessor connects the signal light stalk, the hazard switch, and the control to the wiring harness, wherein the microprocessor receives input from the signal light stalk, the hazard switch, and the control and activates the left front and left rear lights as the left turn indicator at the first flash rate, activates the right front and right rear lights as the right turn indicator at the first flash rate, activates the set of signal lights as hazard lights at the first flash rate, and activates the set of signal lights as increased visibility lights with the flashing pattern, at least a portion of which has the second flash rate that is faster than the first flash rate.

10. The system of claim 9, wherein the microprocessor comprises a body control module associated with the vehicle.

11. The system of claim 8, wherein the flashing pattern comprises a plurality of portions with differing flash rates.

12. The system of claim 8, wherein the control is activated by the signal light stalk.

13. The system of claim 8, wherein the second flash rate is higher than 2 Hertz.

14. The system of claim 8, wherein the second flash rate is substantially between 2 and 6 Hertz.

15. A vehicle lighting safety device comprising:
- a wiring harness wired to activate each one of the set of original vehicle equipment signal lights;
- a microcontroller connected to the wiring harness configured to selectively activate each one of a set of original vehicle equipment signal lights utilizing the wiring harness, including a left front signal light positioned on a left front of the vehicle, a right front signal light positioned on a right front of the vehicle, a left rear signal light positioned on a left rear of the vehicle, and a right rear signal light positioned on a right rear of the vehicle;
- a signal light stalk operatively connected to the wiring harness and the microcontroller to activate either the left front and left rear lights as a left turn indicator at a first flash rate, or the right front and right rear lights as a right turn indicator at the first flash rate; and
- at least one hazard input communicatively coupled to the and the wiring harness and the microcontroller and the at least one hazard input is a driver accessible hazard switch inside the vehicle to activate the set of signal lights at a second flash rate that is perceptibly faster than the first flash rate;
- an accelerometer in communication with the microcontroller; wherein the microcontroller strobes the set of signal lights, at the second flash rate that is perceptibly faster than the first flash rate, simultaneously in response to receipt of a signal from the microcontroller indicative of non-typical driving; wherein the non-typical driving includes rapid deceleration.

16. The device of claim 15, wherein the driver accessible switch is operated by the signal light stalk.

17. The device of claim 15, wherein the microcontroller comprises a body control module associated with non-engine functions of the vehicle.

18. The device of claim 15, wherein the second flash rate is higher than 2 Hertz.

19. The device of claim 15, wherein the microcontroller selectively activates the left front signal light, the right front signal light, the left rear signal light, and the right rear signal light together at the first flash rate.

* * * * *